(12) United States Patent
Kozawa et al.

(10) Patent No.: US 9,720,796 B2
(45) Date of Patent: Aug. 1, 2017

(54) INFORMATION PROCESSING APPARATUS, INFORMATION PROCESSING SYSTEM, CONTROL METHOD FOR INFORMATION PROCESSING SYSTEM, AND MEDIUM

(71) Applicant: FUJITSU LIMITED, Kawasaki-shi, Kanagawa (JP)

(72) Inventors: Yukio Kozawa, Inazawa (JP); Naoki Hayashi, Yokohama (JP); Tsuyoshi Hashimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 35 days.

(21) Appl. No.: 14/812,496

(22) Filed: Jul. 29, 2015

(65) Prior Publication Data
US 2016/0062835 A1     Mar. 3, 2016

(30) Foreign Application Priority Data

Aug. 28, 2014   (JP) ................................. 2014-174371

(51) Int. Cl.
*G06F 11/10*     (2006.01)
*G06F 11/34*     (2006.01)
G06F 11/30       (2006.01)
G06F 11/20       (2006.01)

(52) U.S. Cl.
CPC ...... *G06F 11/3466* (2013.01); *G06F 11/1088* (2013.01); *G06F 11/2094* (2013.01); *G06F 11/3034* (2013.01); *G06F 11/3409* (2013.01)

(58) Field of Classification Search
CPC .................................................. G06F 11/1008
USPC .................. 714/766, 764, 57, 48, 37, 34
See application file for complete search history.

(56) References Cited

U.S. PATENT DOCUMENTS

| 5,852,562 | A | * | 12/1998 | Shinomiya | .......... | G06F 17/5068 |
| | | | | | | 716/122 |
| 6,021,446 | A | * | 2/2000 | Gentry, Jr. | .............. | G06F 13/24 |
| | | | | | | 709/250 |
| 6,079,029 | A | | 6/2000 | Iwatani et al. | | |
| 6,112,130 | A | * | 8/2000 | Fukuda | ............ | G05B 19/41865 |
| | | | | | | 700/105 |

FOREIGN PATENT DOCUMENTS

| JP | 06-266508 | 9/1994 |
| JP | 10-260789 | 9/1998 |

\* cited by examiner

*Primary Examiner* — Fritz Alphonse
(74) *Attorney, Agent, or Firm* — Fujitsu Patent Center

(57) ABSTRACT

An apparatuses includes a processor, a storage unit, and a communication unit to access the storage unit without intermediary of the processor and to access a second apparatus of the plurality of information processing apparatuses via a communication unit of the second apparatus. The communication unit of a first apparatus of the plurality of information processing apparatuses executes at least one of a process of storing redundant data which is generated by making redundant data stored in the storage unit of the first apparatus in the storage unit of the second apparatus via the communication unit of the second apparatus, and a process of acquiring redundant data which is generated by making redundant data stored in the storage unit of the second apparatus via the communication unit of the second apparatus, and storing the acquired data in the storage unit of the first apparatus.

21 Claims, 18 Drawing Sheets

FIG.7

| IO SERVER | ARRANGEMENT OF REDUNDANT BLOCKS | | | | | MATRIX (LATIN SQUARE) FOCUSSING ON REDUNDANT BLOCK NUMBER | | | | |
|---|---|---|---|---|---|---|---|---|---|---|
| IO SERVER 1 | a1 | b5 | c4 | d3 | e2 | 1 | 5 | 4 | 3 | 2 |
| IO SERVER 2 | a2 | b1 | c5 | d4 | e3 | 2 | 1 | 5 | 4 | 3 |
| IO SERVER 3 | a3 | b2 | c1 | d5 | e4 | 3 | 2 | 1 | 5 | 4 |
| IO SERVER 4 | a4 | b3 | c2 | d1 | e5 | 4 | 3 | 2 | 1 | 5 |
| IO SERVER 5 | a5 | b4 | c3 | d2 | e1 | 5 | 4 | 3 | 2 | 1 |

INFORMATION PROCESSING APPARATUS, INFORMATION PROCESSING SYSTEM, CONTROL METHOD FOR INFORMATION PROCESSING SYSTEM, AND MEDIUM

CROSS-REFERENCE TO RELATED APPLICATIONS

This application is based upon and claims the benefit of priority of the prior Japanese Patent Application No. JP2014-174371, filed on Aug. 28, 2014, the entire contents of which are incorporated herein by reference.

FIELD

A certain aspect of the embodiments discussed herein is related to an information processing apparatus, and information processing system, a control method for an information processing system, and a medium storing a control program of an information processing apparatus.

BACKGROUND

Utilized is an information processing apparatus called an Input Output server (which will hereinafter be simply termed the IO server) for providing services as a file system or DBMS (Database Management System) and other equivalent systems, the server including an external storage device instanced by a disk device and other equivalent storages. A decrease in unit price of capacity of the external storage device in recent years facilitates adopting a high-level measure against a failure of the external storage device itself due to, e.g., multiplexing or RAID (Redundant Arrays of Inexpensive Disks) or other equivalent configurations.

DOCUMENT OF PRIOR ART

Patent Document

[Patent Document 1] Japanese Patent Application Laid-Open Publication No. H6-266508
[Patent Document 2] Japanese Patent Application Laid-Open Publication No. H10-260789

SUMMARY

However, even when a plurality of external storage device takes measures against the failure, a controller of the external storage device is not dualized but becomes a single point of failure, and influence is exerted on an information processing apparatus including the external storage device as the case may be. The IO server used as the file system or the DBMS and other equivalent systems in the information processing apparatus is increasingly demanded to ensure further reliability. Further, with an increasing tendency of a system scale for the purpose of improving performance by parallel processing, the information processing apparatus is more increasingly demanded to ensure the reliability than before.

The ensuring of the reliability on the information processing apparatus instanced by the IO server and other equivalent apparatuses can be attained by retaining redundant data, e.g., backing up the data to be processed by the individual information processing apparatus, or retaining the redundant data of Error Correction Code and other equivalent data in the plurality of information processing apparatuses. However, when the plurality of information processing apparatuses retains the redundant data, it is desirable to minimize an increase in memory usage quantity for retaining the redundant data and an increase in overhead due to a process of mutually transferring the redundant data in comparison with a target level of reliability.

One aspect of the present invention is exemplified by an information processing system including a plurality of information processing apparatuses. Each apparatus of the plurality of information processing apparatuses includes an arithmetic processing device to execute an arithmetic process, a storage unit to store data, and a communication unit to access the storage unit without intermediary of the arithmetic processing device and to access a second apparatus of the plurality of information processing apparatuses via a communication unit of the second apparatus. The communication unit of a first apparatus of the plurality of information processing apparatuses executes at least one of a process of storing redundant data which is generated by making be redundant data stored in the storage unit of the first apparatus in the storage unit of the second apparatus via the communication unit of the second apparatus, and a process of acquiring redundant data which is generated by making be redundant data stored in the storage unit of the second apparatus via the communication unit of the second apparatus, and storing the acquired data in the storage unit of the first apparatus.

The object and advantage of the embodiment will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 7 is a diagram illustrating a relation between nodes and redundant blocks;

DESCRIPTION OF EMBODIMENT(S)

One embodiment will hereinafter be described with reference to the accompanying drawings.

Example 1

Figure 1:
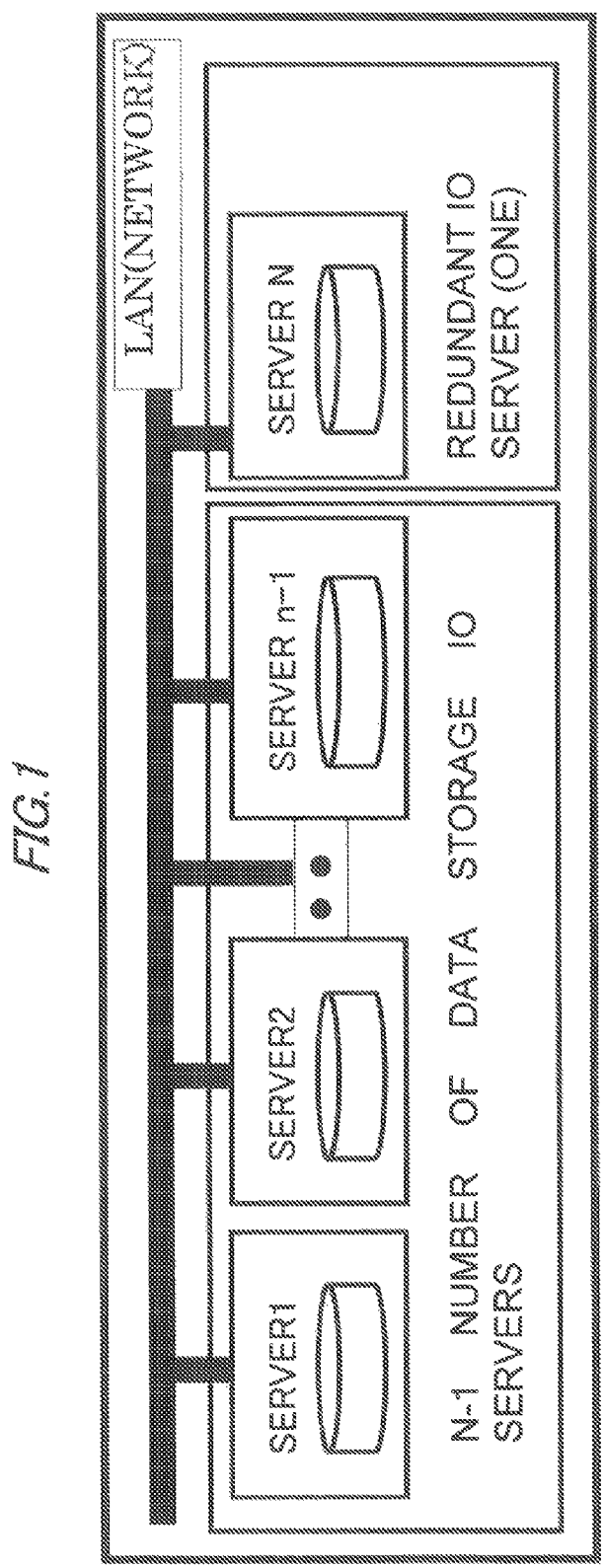
FIG. 1 is a diagram illustrating a configuration of an information processing system.

An information processing system according to a first working example (Example 1) will hereinafter be described with reference to FIGS. 1 through 6. FIG. 1 is a diagram illustrating a configuration of the information processing system. The information processing system includes servers 1-n that are interconnected via a network. Each of the servers 1-n including an external storage device is called an IO server or a disk server to execute a data management process. The server 1, the server n and other equivalent servers are each one example of an information processing apparatus.

The servers 1-(n−1) in the configuration of FIG. 1 in the Example 1 are the IO servers for storing original data before making the data redundant. The IO server for storing the original data is called a data storage server in the Example 1. The server n is the IO server for storing redundant data. The IO server for storing the redundant data is called a redundant data IO server.

The network is exemplified by LAN (Local Area Network) instanced by Ethernet (registered trademark) and other equivalent networks, and also exemplified by WAN (Wide Area Network) instanced by the Internet and other equivalent networks. The network may, however, be an Interconnect instanced by InfiniBand, Crossbar and other equivalent interconnects, the Interconnect establishing node-to-node connections in a multi-node computer system.

Figure 2:
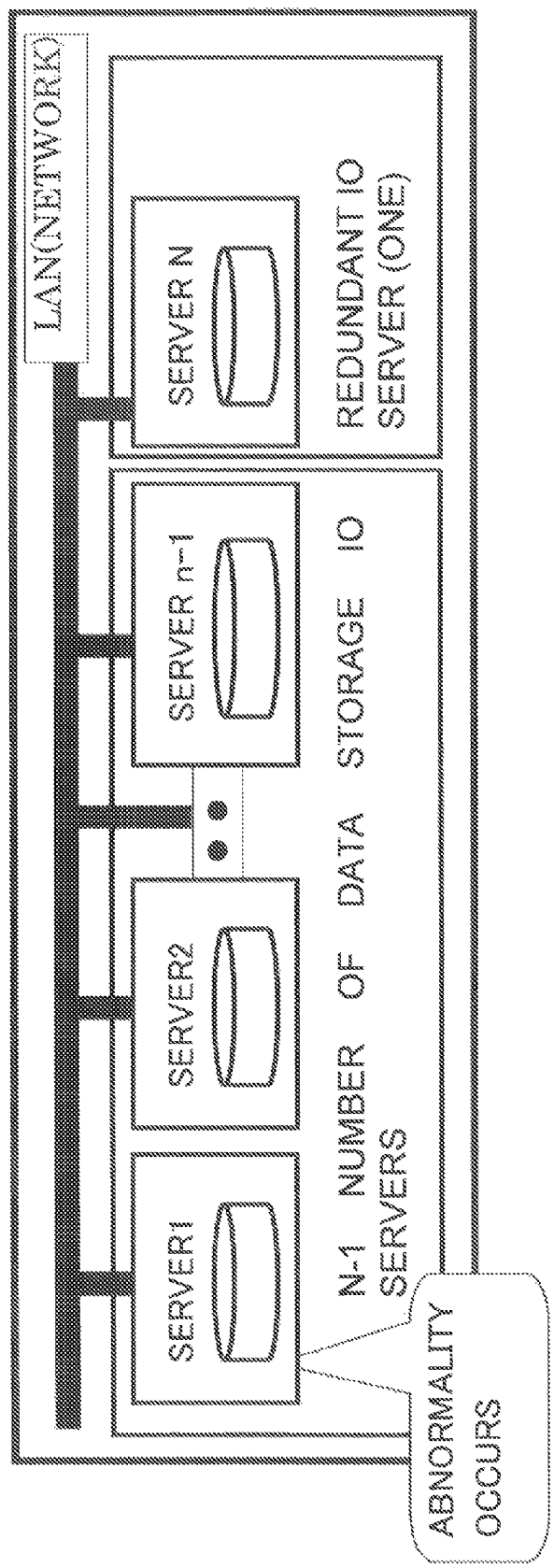
FIG. 2 is an image diagram illustrating a case of abnormality occurs in the information processing system.

FIG. 2 is an image diagram illustrating such a case that abnormality occurs in the information processing system of FIG. 1. The Example 1 is that when the abnormality occurs in the server 1 to disable data stored in the server 1 from being used, the data stored so far in the server 1 are restored by data stored in another server other than the server 1. The server 1, when enabled to continue processing, acquires the data stored in the servers 2 to n−1 and the redundant data stored in the server n, thereby recovering the data of the server 1 itself. Whereas when the server 1 cannot continue processing due to a failure, any one of the server 2 through the server n−1 substitutes for the server 1 to become a data collection server, and the data of the server 1 are restored by the data stored in the servers 2 to n−1 and the redundant data stored in the server n. For example, when the server n stores the redundant data based on exclusive OR of the data stored in the servers 1 to n−1, and when the abnormality occurs in any one of the server 1 through the server n, the data stored in the server encountering the occurrence of the abnormality can be recovered based on the exclusive OR of the data and the redundant data stored in the servers other than the server encountering the occurrence of the abnormality.

Figure 3:
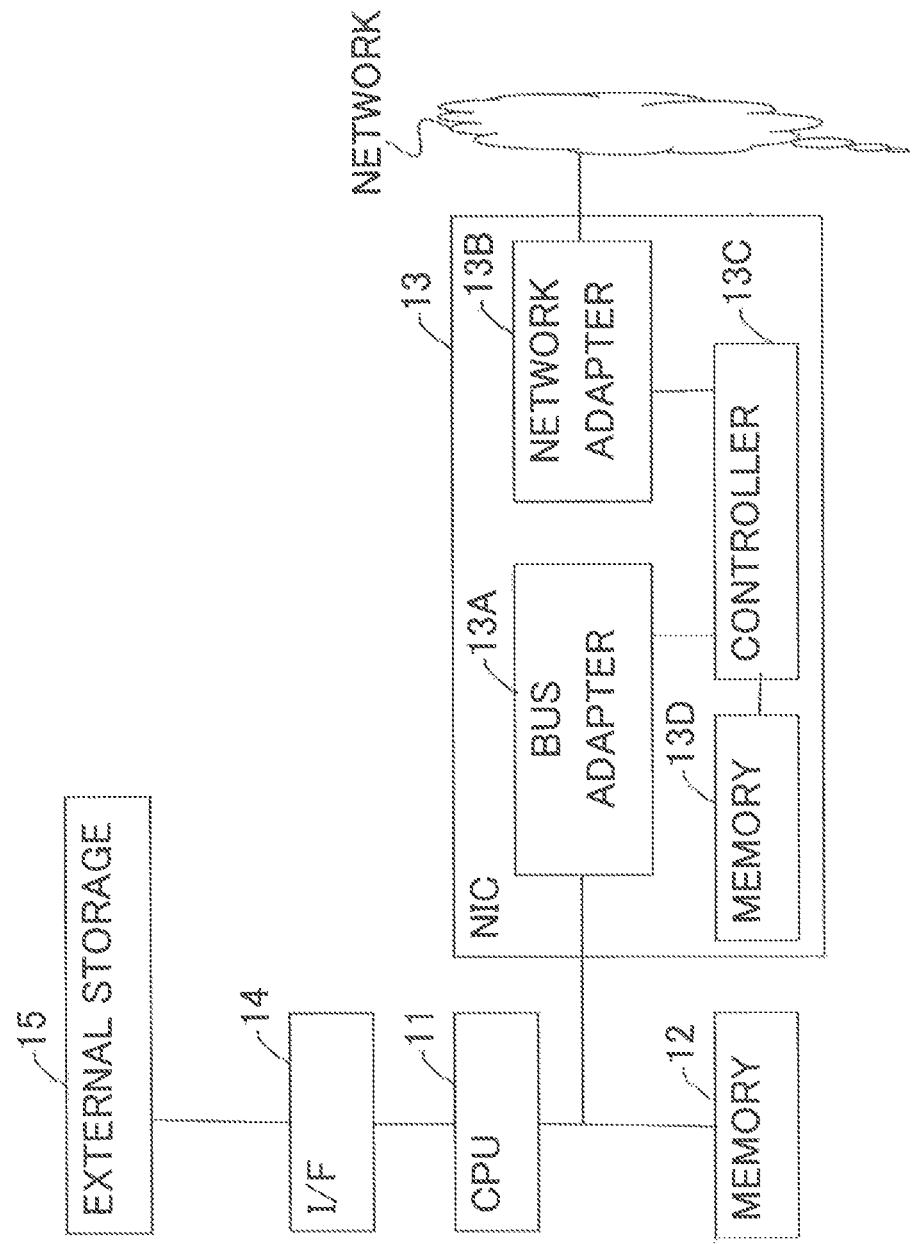
FIG. 3 is a diagram illustrating a hardware configuration of the information processing apparatus used as an IO server.

FIG. 3 is a diagram illustrating a hardware configuration of the information processing apparatus used as the IO server instanced by the node 1 through the node n and other equivalent nodes. The information processing apparatus includes a CPU 11, a memory 12, a NIC (Network Interface Card) 13, an interface 14 and an external storage device 15. The NIC 13 includes a bus adapter 13A, a network adapter 13B, a controller 13C and a memory 13D. The CPU 11 executes processes of the information processing apparatus by use of a computer program deployed in an executable manner on the memory 12. The CPU 11 is one example of a processor or an arithmetic processing device. The memory 12 stores the computer program to be executed by the CPU 11 or the data to be processed by the CPU 11 and post-processing data or other equivalent data. The memory 12 is connected to a bus leading to the CPU 11 and displaced in an address space of the CPU 11. The memory 12 is one example of a storage unit.

The NIC 13 performs communications with another NIC included in another information processing apparatus connected to the network. The bus adapter 13A of the NIC 13 mediates a procedure with the CPU 11 to access the memory 12 via the bus. The network adapter 13B is connected to the network, and transmits transmission data to the network and acquires reception data from the network. The controller 13C controls the bus adapter 13A and the network adapter 13B by use of firmware, a micro-program, the computer program and other equivalent programs that are deployed in the executable manner on the memory 13D, thereby controlling the communications with other information processing apparatuses. The controller 13C is exemplified by a CPU, a DSP (Digital Signal Processor), a programmable logic controller and other equivalent controllers. The memory 13D stores the firmware, the micro-program, the computer program and other equivalent programs to be executed by the controller 13C, the data to be processed by the controller 13C or the post-processing data and other equivalent data of the controller 13C. The NIC 13 is one example of a communication unit.

A part of area of the memory 13D is used as a register of the NIC 13. The register registers a NIC command to be executed by the NIC 13. The NIC command registered by the register is executed by the controller 13C upon an occurrence of a predetermined event. The predetermined event is exemplified by an occurrence of a specified interrupt and other equivalent occurrences. For example, the controller 13C executes the NIC command in a specified register upon receiving the data. The IO server can therefore register the NIC command in the NIC 13 so that the NIC 13 executes the NIC command when a predetermined condition is fulfilled as instanced by when the predetermined event, e.g., the predetermined interrupt occurs, when a predetermined process is finished or when the data reception is completed and by other equivalent conditions. It does not, however, mean that a registered destination of the NIC command to be executed by the NIC 13 is limited to the register in the memory 12.

The controller 13C mediates a right of use of the bus with the CPU 11 via the bus adapter 13A and, after acquiring the right of use of the bus, accesses the memory 12 without via the CPU 11 in the information processing apparatus. The controller 13C executes, e.g., DMA (Direct Memory Access). To be specific, the controller 13C executes writing the data to the memory 12 and reading the data from the memory 12 without via the CPU 11. The controller 13C performs the communications through the network with the NIC of another information processing apparatus via the network adapter 13B. Accordingly, the controller 13C exchanges the data on the memory 12 of the information processing apparatus itself with the data on the memory of another information processing apparatus without via the CPU 11.

The interface 14 connects the CPU 11 to the external storage device 15. The external storage device 15 connects to the CPU 11 via the interface 14. Data on the external storage device 15 are managed on a file-by-file basis by a base program, OS (Operating System) and other equivalent programs to be executed by the CPU 11.

The CPU 11 reads the data on the external storage device 15 into the memory 12, and saves the data of the memory 12 in a file of the external storage device 15. The memory therefore has a role as a cache or a buffer for the external storage device 15.

The foregoing configuration being thus attained, the information processing apparatus serving as the IO server within the information processing system instructs another information processing apparatus to read the data on the external storage device 15 of another information processing apparatus into the memory 12 of another information processing apparatus, and thereafter waits for completion of readout. The information processing apparatus can acquire the data on the external storage device 15 of another information processing apparatus, which data have been read into the memory 12 of another information processing apparatus, through the communications between the NICs 13 without via the CPU 11. Similarly, the information processing apparatus itself in the information processing system can read the data on the external storage device 15 into the memory 12 and can write the data to the memory 12 of another information processing apparatus through the communications between the NICs 13 without via the CPU 11. Note that another information processing apparatus saves the data of the memory 12 of another information processing apparatus in the external storage device 15 of another information processing apparatus at a proper timing. A remote NIC command execution mechanism represents a mechanism for thus executing the processing between the information processing apparatuses through the access of the NIC 13 to the memory 12 and the communications performed between the NICs 13 or other equivalent operations without via the CPU 11. The remote NIC command execution mechanism is implemented by the NIC command in Examples 1 through 3 that follow.

Figure 4:
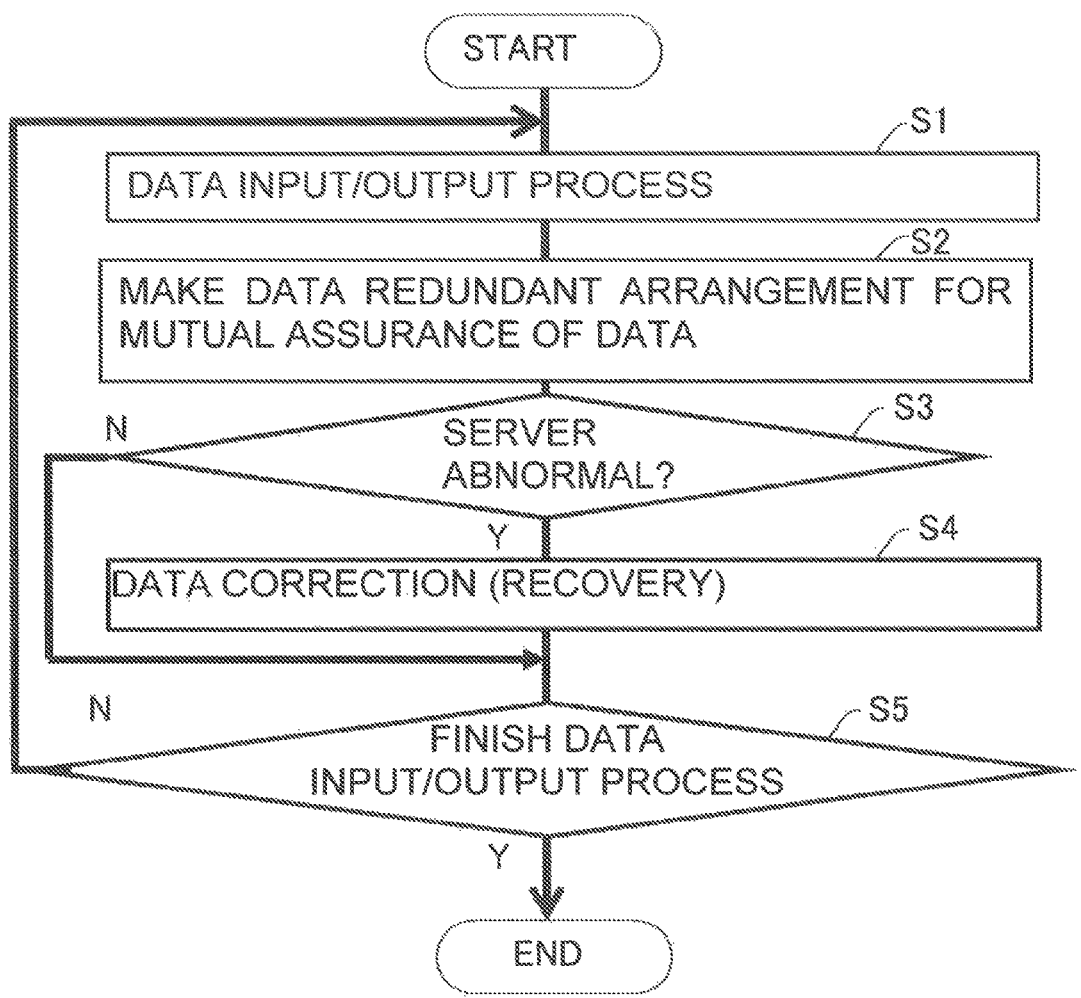
FIG. 4 is a flowchart illustrating a data correction process when the abnormality occurs in the information processing system.

FIG. 4 is a flowchart illustrating a data correction process when the abnormality occurs in the information processing system. FIG. 4 illustrates a processing example of the data storage IO server. The data storage IO server executes, e.g., an Input/Output (IO) process of the data (S1). The input process of the data herein connotes, e.g., a process of storing the data in the information processing system from a client apparatus outside the information processing system. The output process of the data connotes, e.g., a process in which the external client apparatus reads the data from the information processing system.

When the process in S1 is the input process of the data, the data storage IO server performs data redundant allocation for mutual assurance of the data (S2). The NIC 13 of the data storage IO server stores the redundant data of the data stored in the memory 12 of the NIC 13 itself into the memory of the redundant data IO server via the NIC 13 of another server, e.g., the redundant data IO server.

A first example of the redundant data is a copy of the original data to be saved in the data storage IO server. In the Example 1, each data storage IO server in the information processing system saves a corresponding piece of (n–1) pieces of segmented data into which the data provided from the client are segmented, and transmits copies of the corresponding piece of the segmented data to the redundant data IO server. The copy of the segmented data will hereinafter be called a redundant block. The copy (redundant block) of the segmented data, which is transmitted to the redundant data IO server, is one example of redundant data. The NIC 13 of the data storage IO server executes the process in S2 by way of one example of a process of storing the acquired data in the storage unit of the first apparatus.

The redundant data IO server acquires the copy of the segmented data (redundant block) from the data storage IO server and retains the redundant block in the memory of the redundant data IO server in the process of S2. The NIC 13 of the redundant data IO server acquires the redundant data via a communication unit of another information processing apparatus, and executes the process in S2 as one example of a process of acquiring redundant data via the communication unit of the second apparatus, and storing the acquired data in the storage unit of the first apparatus. Note that the redundant data IO server executes the exclusive OR of the copies (redundant blocks) of the segmented data transmitted from the respective data storage IO servers, and generates further redundant data. The data generated by the exclusive OR of the plural pieces of segmented data are also one example of the redundant data.

However, the process in S2 can be executed also in information processing systems other than the information processing system including the IO servers differentiated into the data storage IO server and the redundant data IO server as in FIG. 1. An Example 2 will discuss an information processing system including the plurality of IO servers each having a role as the data storage IO server and a role as the redundant data IO server. In the information processing system given in the Example 2, the NIC 13 of the IO server within the information processing system stores, as the process in S2, the copy (redundant block) of the segmented data stored in the memory 12 of the IO server itself into the memory 12 of another IO server via the NIC 13 of another IO server. Further, the NIC 13 of the IO server within the information processing system acquires, in the process in S2, the copy (redundant block) of the segmented data from another IO server via the NIC 13 of another IO server, and retains the redundant block in the memory 12 of the IO server itself.

The data storage IO server determines whether the abnormality occurs in any of the data storage IO servers or the redundant data IO server (S3). When none of the abnormality occurs, the data storage IO server advances the processing to S5. Whereas when the abnormality occurs in any of the data storage IO servers or the redundant data IO server, the data storage IO server executes a data recovery process (S4). The NIC 13 of the data storage IO server executes the process in S4 as one example of a process of recovering the normal data.

When the abnormality occurs in any of the data storage IO servers, the normal data of the data storage IO server encountering the occurrence of the abnormality are recovered by the data of the data storage IO server excluding the data storage IO server with the abnormality and by the data of the redundant data IO server. As already described in FIG.

2, when the data storage IO server with the abnormality can continue processing, the data storage IO server with the abnormality may recover the normal data. When any of the data storage IO servers is set as the management server, it may be sufficient that the management server recovers the normal data. The data storage IO server set as the management server generates, when the abnormality occurs in the redundant data IO server, generates the data of the redundant data IO server from the data of the management server itself or another data storage IO server. The information processing system may include a dedicated management server in place of setting one data storage IO server as the management server.

The data storage IO server determines whether the data I/O process is finished or not (S5). When determining in S5 that the data I/O process is not finished, the data storage IO server loops back the processing to S1. Whereas when determining in S5 that the data I/O process is finished, the data storage IO server finishes the processing.

Figure 5:
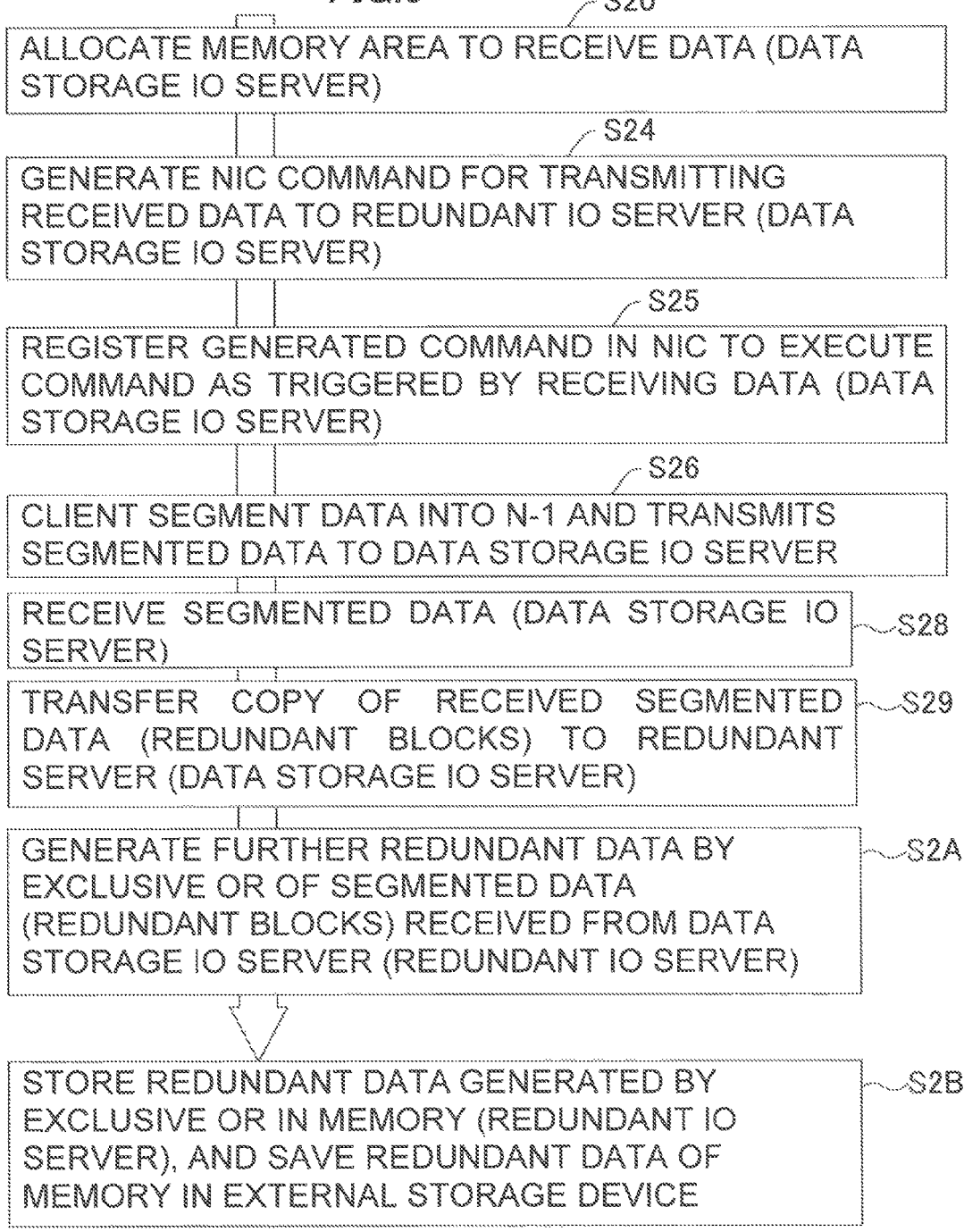
FIG. 5 is a diagram illustrating a processing flow to segment data into (n−1) pieces of segmented data and distribute the segmented data to the IO servers by use of a remote NIC command execution mechanism.

FIG. 5 depicts a processing flow to segment the data into (n−1) pieces of segmented data and distribute the segmented data to (n−1) number of data storage IO servers by use of the remote NIC command execution mechanism in an environment including n-number of IO servers in the Example 1. Processes in FIG. 5 may be considered as a detailed example of S2 in FIG. 4.

In these processes, the data storage IO server at first ensures a memory area for receiving the data (S20). Next, the data storage IO server generates the NIC command for transmitting the received data to the redundant data IO server (S24). The data storage IO server registers the NIC command in the NIC 13 so that execution of the generated NIC command is triggered by receiving the data (S25). The client segments the data, e.g., into (n−1) pieces, and transmits each of the (n−1) pieces of segmented data to the corresponding data storage IO servers (S26). The client segments the data into "n−1" pieces in the example of FIG. 5. However, in place of this process, the client may hand over the pre-segmenting data to any one of the data storage IO servers, e.g., to the data storage IO server set in the management server. The IO server to transfer and receive the data to and from the client is herein called the management server. The data storage IO server set in the management server may segment the copy of the data handed over therefrom into "n−1" pieces, and may transmit the generated each of the "n−1" pieces of segmented data to the corresponding data storage IO servers.

The data storage IO server receives the data from the client (S28). The NIC 13 of the data storage IO server transfers the copy (redundant block) of the received segmented data to the redundant data IO server upon executing the remote NIC command as triggered by receiving the data (S29).

In the Example 1, however, as will be described in S2A, the redundant block transferred to the redundant data IO server is used as the input data for the exclusive OR. The NIC 13 of the data storage IO server executes the process in S29 as one example of a process of storing redundant data in the storage unit of the second apparatus. The copy of the received data is one example of the redundant data. The NIC 13 of the redundant data IO server receives the copy (redundant block) of the segmented data, and retains the received data in the memory in the process of S29. The NIC 13 of the redundant data IO server executes the process in S29 as one example of a process of acquiring redundant data which is generated by making be redundant data stored in the storage unit of the second apparatus via the communication unit of the second apparatus, and storing the acquired data in the storage unit of the first apparatus.

The redundant data IO server generates further redundant data by performing the exclusive OR of the copies (redundant blocks) of the segmented data received from the data storage IO servers (S2A). The further redundant data is also one example of the redundant data, the further redundant data being generated by the exclusive OR of the copies (redundant blocks) of the segmented data received from the data storage IO servers. In the Example 1, however, when the abnormality occurs in any of the data storage IO servers, the normal data are recovered by the segmented data retained in another data storage IO server and by the redundant data (based on the exclusive OR) stored in the redundant data IO server.

The redundant data IO server stores, in the memory 12, the redundant data generated by the exclusive OR from the received redundant blocks (S2B). The CPU 11 of the redundant data IO server saves the redundant data of the memory 12 in the external storage device 15 at the proper timing. The proper timing indicates a timing at which, e.g., any of the CPU 11, the memory 12, the bus between the CPU 11 and the memory 12, the interface 14 and the external storage device 15 does not have a high load, or a timing at which these hardware components are not occupied by other processes, and other equivalent timings. The processes in S29, S2A and S2B are one example of acquiring redundant data.

Figure 6:
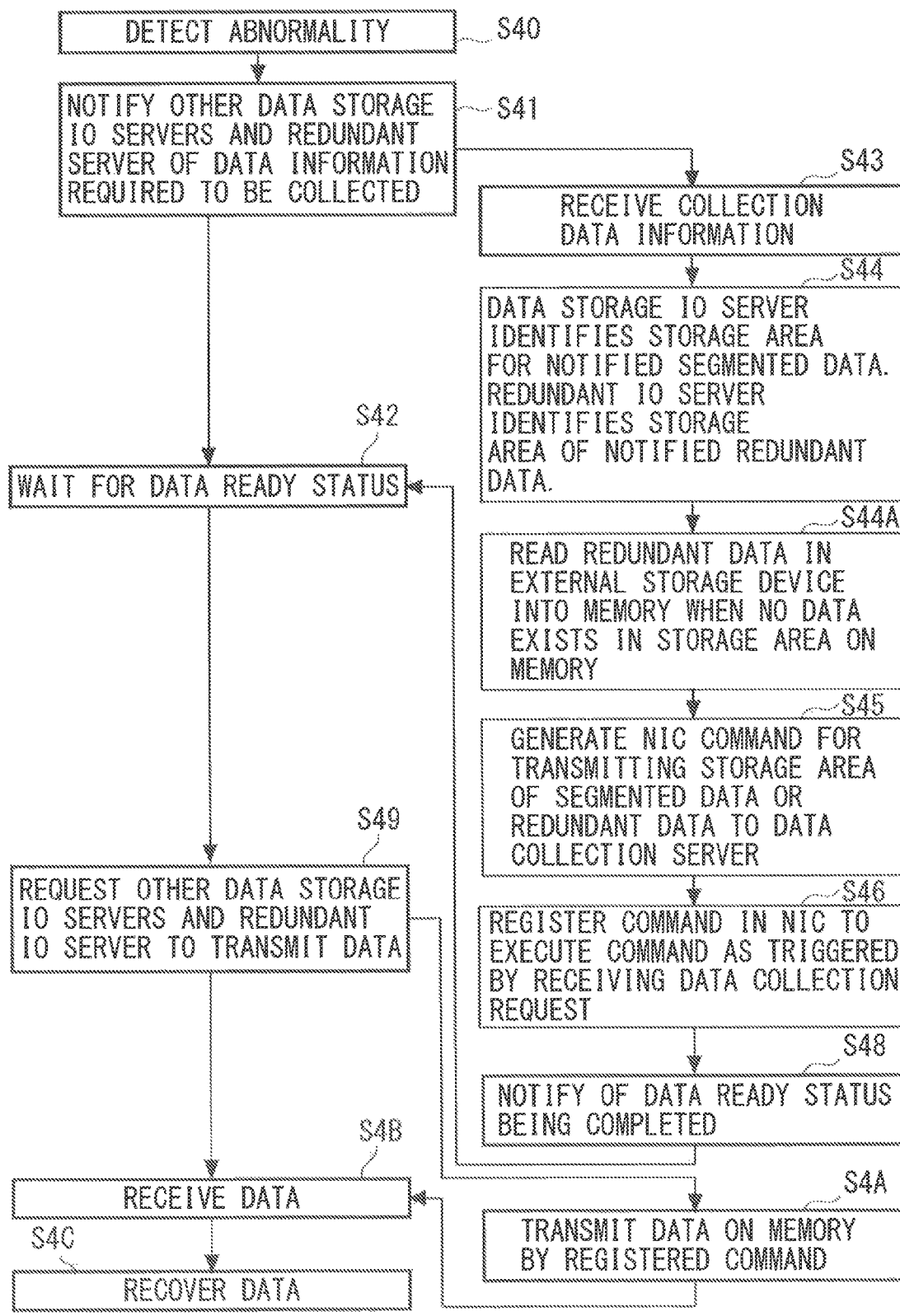
FIG. 6 is a diagram illustrating a flowchart of processes of recovering the data upon occurrence of data abnormality in a data storage IO server.

FIG. 6 illustrates a flowchart of processes of recovering the normal data upon occurrence of data abnormality in any of the data storage IO servers. An assumption in FIG. 6 is that the data storage IO server encountering the occurrence of the data abnormality executes the data recovery process. At first, one data storage IO server detects the data abnormality (S40). Time of the abnormality being detected in S40 is one example of when abnormality is detected in any one of a plurality of information processing apparatuses. The data from which the abnormality is detected is one piece of "n−1" pieces of segmented data into which to have segmented the data.

The data storage IO server encountering the occurrence of the data abnormality transmits notification of the data desired to be collected (which will hereinafter be referred to as collection data information) to another data storage IO server and the redundant data IO server (S41). The data storage IO server encountering the occurrence of the data abnormality becomes a data collection server to recover the normal data in the Example 1. However, in place of the data storage IO server with the occurrence of the data abnormality, the data storage IO server set in the management server may become the data collection server to execute the processes in FIG. 6. Hereinafter, in the Example 1, one piece of segmented data with the occurrence of the abnormality among the "n−1" pieces of segmented data into which to have segmented the data (which will hereinafter be termed "(n−1) segmented data") is recovered to the normal data.

The Example 1 is based on the premise that the data collection server recognizes a storage location of the (n−1) segmented data of the client data. For example, when the management server segments the original data into "n−1" pieces, it may be sufficient that the management server recognizes and retains the storage location of the "n−1" pieces of segmented data. It may be therefore sufficient that the data collection server query the management server about the storage location of the "n−1" pieces of segmented data. When the client transmits the (n−1) pieces of segmented data to the data storage IO server, it may be sufficient that the client notifies each data storage IO server, within the information processing system, of a relation between each of the "n−1" pieces of segmented data and a distributing destination.

The data collection server requests the data storage IO server as the storage location of the (n−1) segmented data to transmit the (n−1) segmented data, and requests the redundant data IO server to transmit the redundant data in the process of S41. The data collection server waits for the data till the data are transmitted (S42).

On the other hand, another data storage IO server and the redundant data IO server receives the collection data information transmitted in S41 (S43). The process in S43 is one example of accepting a transfer request of the redundant data. Another data storage IO server and the redundant data IO server identify a storage area of collection target data from the notified collection data information (S44). Herein, the collection target data to be collected by another data storage IO server is any one piece of (n−1) segmented data to be stored by the self server. The collection target data to be collected by the redundant data IO server is the redundant data generated by the exclusive OR of the (n−1) number of segment blocks (redundant blocks).

Another data storage IO server and the redundant data IO server read the collection target data from the external storage device 15 when the collection target data are stored in the external storage device 15 but are not retained in the memory 12 (S44A). The IO servers (another IO server and the redundant data IO server) execute the process in S44A by way of one example of a process of reading data of an external storage device into a memory.

Another IO server and the redundant data IO server generate the NIC command for transmitting a storage area of the collection target data to the data collection server (S45). The NIC command contains a network address of the data collection server, and a storage head address, a data length and other equivalent information of the storage area specified in S44. A tail address of the storage area may, however, be specified in place of the data length. Another data storage IO server and the redundant data IO server register the NIC command so that the execution of the NIC command is triggered by receiving the data (S46). The process in S46 is one example of a step of registering a command to execute a process of transferring redundant data at a predetermined timing. Another IO server and the redundant data IO server notify the data collection server of a ready status being completed (S48).

The data collection server, upon receiving the notification of the data ready status being completed from another data storage IO server and the redundant data IO server that have transmitted the collection data information, transmits a data transmission request to another data storage IO server and the redundant data IO server (S49). In another data storage IO server and the redundant data IO server, upon a reception of the data transmission request, the controllers 13C of the NICs 13 execute the registered NIC command, and transmit the data collection target data to the NIC 13 of the data collection server (S4A). The data collection server receives the collected pieces of segmented data (excluding the segmented data with the occurrence of the abnormality) from another data storage IO server and the redundant data (S4B), and recovers the normal data (S4C). The NIC 13 of the data collection server executes the process in S4B as one example of acquiring data for recovering the normal data. The NIC 13 of the data collection server also executes the process in S4C as one example of recovering normal data. The segmented data from another data storage IO server is one example of data for recovering the normal data in combination with redundant data.

As discussed above, in the information processing system including the data storage IO servers and the redundant data IO server according to the Example 1, the segmented data, into which the data of the client are segmented, are stored in each data storage IO server, and the copies of the segmented data are transferred to the redundant data IO server not via the CPUs but via the NICs 13 of the data storage IO server and of the redundant data IO server. The redundant data IO server generates the further redundant data by the exclusive OR of the copies of the segmented data, and saves the further redundant data in the external storage device from the memory. When the data abnormality occurs in any of the data storage IO servers, the data storage IO server with the occurrence of the abnormality or another data storage IO server (the management server or another equivalent server) executes the processes as the data collection server. In other words, the data collection server collects the data not via the CPUs but via the NICs 13 of another data storage IO server and of the redundant data IO server, and recovers the data with the occurrence of the abnormality. It is therefore feasible in the information processing system to transfer the copy of the segmented data (redundant block) through the remote NIC command execution mechanism of the NIC 13 while restraining the load on the CPU 11 from increasing. The redundant data IO server can generate the further redundant data from the copies (redundant blocks) of the segmented data transferred therefrom, and can save the generated data. In the information processing system, when the abnormality occurs in any of the data storage IO servers, the data collection server can collect the segmented data exclusive of the segmented data with the occurrence of the abnormality and the redundant data thought the remote NIC command execution mechanisms of the NICs 13, and can recover the normal segmented data.

The data of the data storage IO servers and the data of the redundant data IO server are normally saved in the external storage devices in this case. When the data collection server collects the data through the remote NIC command execution mechanisms of the NICs 13, it may be therefore sufficient that the collection data information contains a setting to instruct the data storage IO server to read the data into the memory 12 from the external storage device 15. It may be sufficient that the CPU 11 of the data storage IO server reads the segmented data from the external storage device 15 into the memory 12 and thereafter notifies of the ready status being completed in S48.

It may be sufficient that the data collection server sets the collection data information so as to instruct the redundant data IO server to read the redundant data from the external storage device 15 into the memory 12. It may be also sufficient that the CPU 11 of the redundant data IO server reads the redundant data from the external storage device 15 into the memory 12 and thereafter notifies of the ready status being completed in S48. These processes enable a linkage between inter-server communications of the IO servers not via the CPUs 11 but via the NICs 13 and the accesses of the CPUs 11 to the external storage devices 15. This results in improving reliability of the data in the IO servers to a greater degree than hitherto while restraining the loads on the CPUs and an overhead accompanying the data transfer.

The discussion in FIG. 6 has been made by exemplifying the case in which the data abnormality occurs in the data storage IO server. However, processes in the case of the occurrence of the data abnormality in the redundant data IO server are the same as in FIG. 6. To be specific, when the data abnormality occurs in the redundant data IO server, it may be sufficient that the redundant data IO server functions as the information collection server to collect the (n−1) segmented data from the data storage IO servers and to generate again the redundant data.

According to Example 1, the client transmits the (n−1) segmented data of the client data to the data storage IO servers as illustrated in S26 of FIG. 5. It does not, however, mean that the configuration and the processes of the information processing system are limited to the foregoing configuration and the processes in FIG. 5. For example, one server (the management server) in the data storage IO server may transfer and receive the data to and from the client. It may be predetermined that one of the data storage IO servers functions as the management server to execute the processes in, e.g., a given order of priority. It may be also sufficient that the data storage IO servers and the redundant data IO server retain a system parameter of the information processing system, the parameter representing designation about which order of priority and which data storage IO server functions as the management server to execute the processes. When the client transmits the data to the management server, it may be sufficient that the management IO server generates the blocks by segmenting the data into "n−1" segments and transmit the generated blocks to other data storage IO servers. The management server may transmit the segmented data stored in the management server itself to the redundant data IO server, and may instruct other data storage IO server to transmit the segmented data stored therein to the redundant data IO server.

According to the Example 1, the data storage IO servers and the redundant data IO server collects the data of the servers exclusive of the data storage IO server with the occurrence of the abnormality through the remote NIC command execution mechanisms for execute the remote NIC command, and recover the normal data. In place of these processes, for instance, the controllers 13C of the NICs 13 of the plurality of IO servers may recover the normal data by carrying out a "Reduction Operation" pursuant to standards of MPI (Message Passing Interface).

The NIC 13 of the redundant data IO server can generate the redundant data without via the CPU 11 by executing the exclusive OR of the data stored in the memories 12 of the plurality of data storage IO servers by way of the "Reduction Operation". The data collection server, i.e., one of the data storage IO servers, can recover the normal data without via the CPU 11 by executing the exclusive OR of the segmented data stored in other data storage IO servers and the redundant data stored in the redundant data IO server.

Example 2

The information processing system according to a second example (Example 2) will be described with reference to FIGS. 7 through 11. In the Example 1, the nodes 1 through n−1 of the information processing system are the data storage IO servers, and the node n is the redundant data IO server. It does not, however, mean that the information processing system is limited to the configuration of the Example 1. Namely, it does not mean that the information processing system is limited to the configuration of the specified node being set as the fixed redundant data IO server.

Such being the case, the Example 2 will discuss the information processing system not including the fixed redundant data IO server. The Example 2 has the same topology among the IO servers as in FIG. 1 and other equivalent drawings. However, the nodes from 1 through n (which is hereinafter described in terms of as nodes 1-n), which are equal to each other, store their original data and retain the segmented data into which the original data of other nodes are copied and segmented. The segmented data into which the original data of other nodes are copied and segmented are called the redundant blocks also in the Example 2.

The nodes 1-n may retain, as additional redundant blocks, data generated further by the exclusive OR or other equivalent operations of the segmented data (redundant blocks) into which the original data are copied and segmented. The IO server may not, however, retain the additional redundant blocks and may be set as a null block. Note that the relation between the IO servers, the configuration other than the method of retaining the data and the operation in the Example 2 described above, are the same as in the Example 1. This being the case, the same components in the Example 2 as those in the Example 1 are marked with the same numerals and symbols, and the explanations thereof are omitted. The information processing system according to the Example 2 may execute the processes exemplified in the Example 1 and may also execute processes exemplified hereinafter in the example 2.

FIG. 7 illustrates a relation between the nodes and the redundant blocks in the Example 2. The following Example 2 does not provide the fixed redundant data IO server. Each node apparatus is simply referred to as the IO server. FIG. 7 illustrates an example that a node count is "5", in which the nodes 1-5 are depicted as the IO servers 1-5. The original data of the IO servers 1-5 correspond to data A-E in the Example 2. The IO server 1 equally segments the original data A and generates redundant blocks a2-a5 to be stored in the IO servers 2-5. The IO server 1 transfers the redundant blocks a2-a5 to the IO servers 2-5. The IO server 1 also retains the original data and the additional redundant block a1. The additional redundant block a1 may be either a null block or data generated by the exclusive OR of the redundant blocks a2-a5. Generated are similar redundant blocks of the original data B of the IO server 2, and other equivalent data.

A matrix focused on redundant block numbers in a table of FIG. 7 is an array of block numbers being extracted from their notations. To be specific, the table of FIG. 7 is structured such that the redundant blocks are arranged in association with the IO server 1-5, each of the IO servers being given the numbering of each of the redundant blocks 1, and further given the numbering which is increasing from "1" to "5" according to the increasing direction of the IO server numbers to form Latin square in each row of the table. The following is a procedure of arranging the redundant blocks in FIG. 7.

(1) A copy of data Ai is segmented into (n−1) number of blocks each having the same size. The blocks having the segmented redundant data are called the redundant blocks.

(2) The "additional redundant block" having the same size is added. The additional redundant block is considered to have the following two types.

(2-1) Null block: the null block is a block to which the block number is allocated in order to attain a means for arranging the redundant blocks as will be described later on. Note that the null block does not contain actual data. Each IO server may not allocate a storage area for the null block. When the additional redundant block is set as the null block, for example, a user of the information processing system can reduce the processes related to the data reliability by decreasing a modification of a computer program of each IO server and can restrain a data quantity from increasing.

(2-2) Non-null block: the exclusive OR of the (n−1) number of redundant blocks generated in the procedure (1) is stored in the additional redundant block. The exclusive OR of the redundant blocks being saved, when the abnormality occurs in, e.g., the original data A and any one (block ak) of the redundant blocks, the redundant block ak can be recovered by the redundant blocks other than the redundant block ak and by the exclusive OR of the redundant blocks, and the original data can be also recovered.

A detailed example of the arrangement of the redundant blocks as in FIG. 7 will hereinafter be described. totally (n*n) number of redundant blocks are generated from the original data of n-number of IO servers, where * represents product or multiplication. However, when the additional redundant block is set as the null block, substantially n*(n−1) number of redundant blocks are generated. The IO servers may arbitrarily determine allocation destinations of block numbers i. However, the block generated by the exclusive OR of the redundant blocks or the null block is allocated to the additional redundant block of each IO server itself.

The following is a specific example of the redundant block arrangement process illustrated in FIG. 7. To be specific, FIG. 7 illustrates the arrangement of the redundant blocks, in which n is given by n=5 for the sake of simplicity; a distinction between data and data is made not by a suffix but by a character; the data of the IO servers 1-5 are written as A, B, C, D, E; and the redundant blocks to be generated are expressed by {a1, . . . , a5}, {b1, . . . , b5}, {c1, . . . , c5}, {d1, . . . , d5}, {e1, . . . , e5}.

As described below, the redundant blocks are arranged so that the redundant block numbers form "Latin square". Herein, the Latin square in the example of FIG. 7 is that the redundant blocks are arranged in a matrix of 5 rows 5 columns (generally a matrix of n-rows n-columns) in the example, and the block numbers are arranged so that the same block number does not appear a plural number of times in each row and each column. Note that when "the block number of the block generated by the exclusive OR" and the block number of "the null block" are set to the same number (1) in all of the IO servers, a "circulant matrix" as illustrated in FIG. 7 can be used by way of the "Latin square". This data arrangement enables the normal data to be recovered from the redundant blocks retained by the (n−1) number of remaining IO servers when a failure occurs in one arbitrary server of the n-number of IO servers.

A data distributing/collecting process acceleration mechanism is herein described. When attaining the redundant data arrangement based on the Latin square described above, each IO server performs a communication to "allocate (n−1) number of data blocks to other (n−1) number of IO servers one by one at the minimum". This pattern of communication is called "scatter".

The recovery of the data disappearing due to the abnormality of one IO server in the n-number of IO servers entails performing a communication to collect the (n−1) number of data blocks from the (n−1) number of IO servers. This pattern of communication is called "gather".

Communication processes exemplified by "scatter", "gather" and other equivalent communication processes are executed generally by using a CPU process (Program I/O: PIO). The PIO process causes a processing load on the CPU. Such being the case, the Example 2 uses, similarly to the Example 1, the remote NIC command execution mechanism defined as a hardware mechanism requiring less of load on the CPU process. One example of the remote NIC command execution mechanism is illustrated in FIG. 3 in the Example 1. The "remote NIC command execution mechanism" is attained by a mechanism called CORE-Direct implemented in, e.g., the InfiniBand apparatus of Mellanox Technologies, Ltd. Provided is the information processing system configured so that the remote NIC command execution mechanism reduces the processing load on the CPU to a possible degree but does not hinder the processes other than the processes instanced by a calculation process, an application process and other IO processes.

In the remote NIC command execution mechanism, the NIC 13 depicted in FIG. 3 executes the preset NIC command, e.g., a data transmission command without via the CPU 11 as triggered by an event designated by each IO server, the event being instanced by occurrence of data reception and other equivalent events. The NIC 13 remotely executes "scatter", "gather" and other equivalent communication processes of the data to other IO servers. Specifically, the NIC 13 remotely operates other IO servers (i.e. node B) from a certain IO server (i.e. node A), and remotely executes "scatter", "gather" and other equivalent communication processes of the data to other IO servers.

Figure 8:
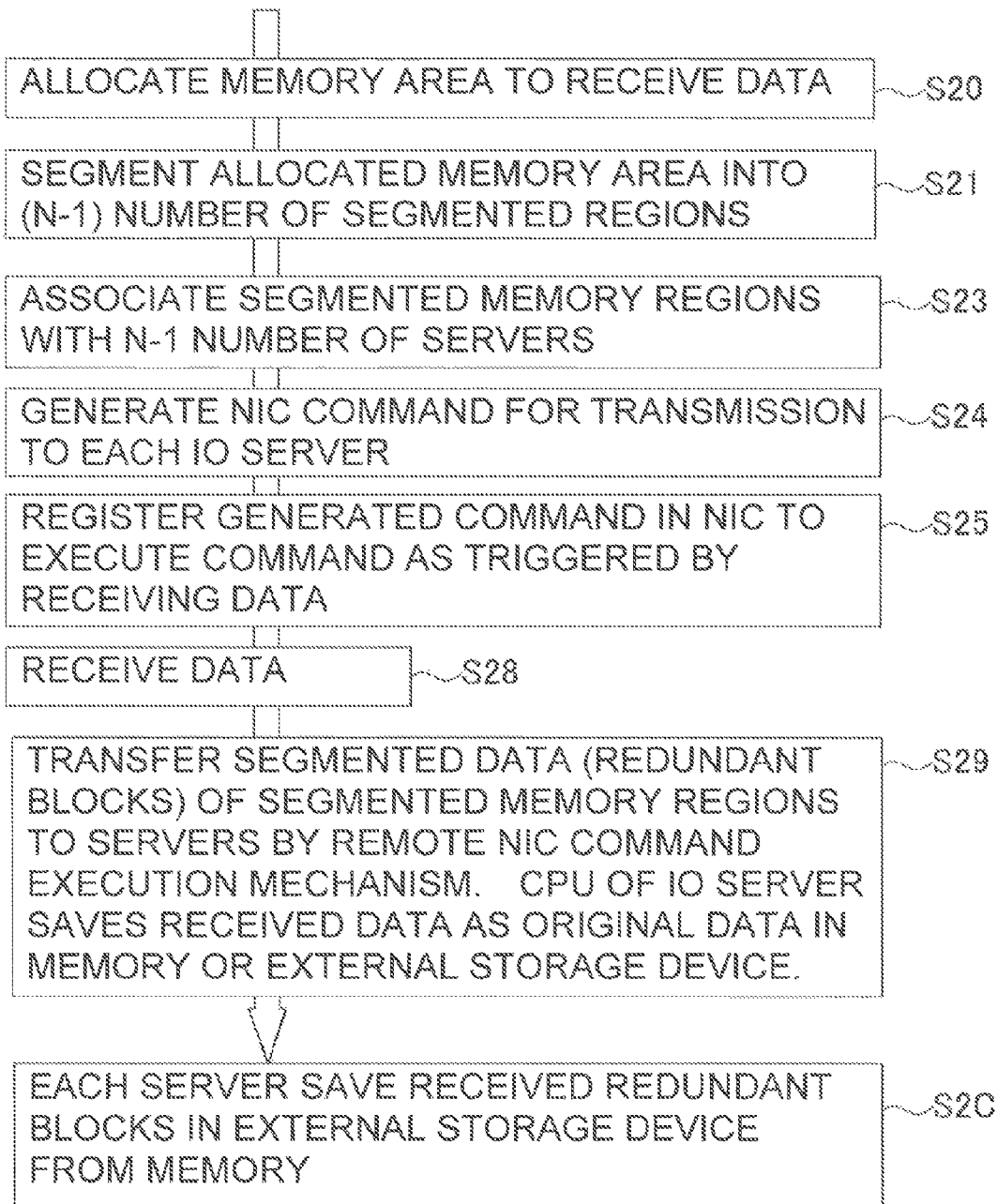
FIG. 8 is a diagram illustrating a processing flow in such a case that each IO server distributes (n−1) pieces of redundant data into which the data are segmented by using the remote NIC command execution mechanism.

FIG. 8 illustrates a processing flow in such a case that each IO server distributes the redundant blocks to other IO servers by using the remote NIC command execution mechanism. Processes in FIG. 8 may be considered as one of detailed examples of S2 in FIG. 4.

In these processes, at first, each IO server allocates the memory area for receiving the data (S20). The memory area allocated herein may be called, e.g., a reception buffer. Next, the IO server segments the allocated memory area into (n−1) number of segmented regions (S21). The IO server associates the segmented memory regions with (n−1) number of IO servers (S23). The CPU 11 of the IO server executes the processes in S21 and S22 as one example of generating segmented redundant blocks being segmented corresponding to the number of information processing apparatuses exclusive of a self apparatus from copied redundant data.

The IO server generates the NIC command for transmitting the data of the segmented memory regions to other IO servers (S24). The IO server registers the NIC command so that the execution of this generated NIC command is triggered by receiving the data (S25). Note that the IO server hereat saves a relation between the segmented memory regions and the other IO servers to which the data are transferred. The IO server can specify a collection destination of the segmented blocks when collecting and recovering the data by referring to the saved relation.

Any one of the IO servers receives the data (S28). The NIC 13 of the IO server having received data transfers, based on the remote NIC command execution mechanism, the data (redundant blocks) of the segmented memory regions to the associated IO servers (S29). The data (redundant blocks) transferred from the (n−1) number of segmented memory regions in the process of S29 are one example of segmented redundant blocks. The data (redundant blocks) transferred in the process of S29 are also one example of redundant data. The NIC 13 of the IO server executes the process in S29 by way of one example of a process of storing redundant data in a storage unit of the second apparatus. Note that the IO server saves the original data having received in S28 in, e.g., the memory 12 or the external storage device 15. It may be therefore said that the data transferred in the process of S29 are the "n−1" redundant blocks into which the copy of the original data is segmented.

Further, the IO server having received the redundant blocks in the process of S29 saves the received redundant blocks in the external storage device from the memory 12 at a proper timing (S2C). The IO server executes the process in S2C as one example of saving the acquired data in the external storage device. The "proper timing" indicates, as already stated, the timing at which the CPU 11 and other resources are not occupied, and other equivalent timings. The IO server having received the data in S28 may, though omitted in FIG. 8, generate the redundant data by the exclusive OR of the (n−1) number of segmented and save the generated redundant data as additional redundant blocks in the IO server itself. The processes in S29 and S2C are one example of a step of acquiring the redundant data.

Figure 9:
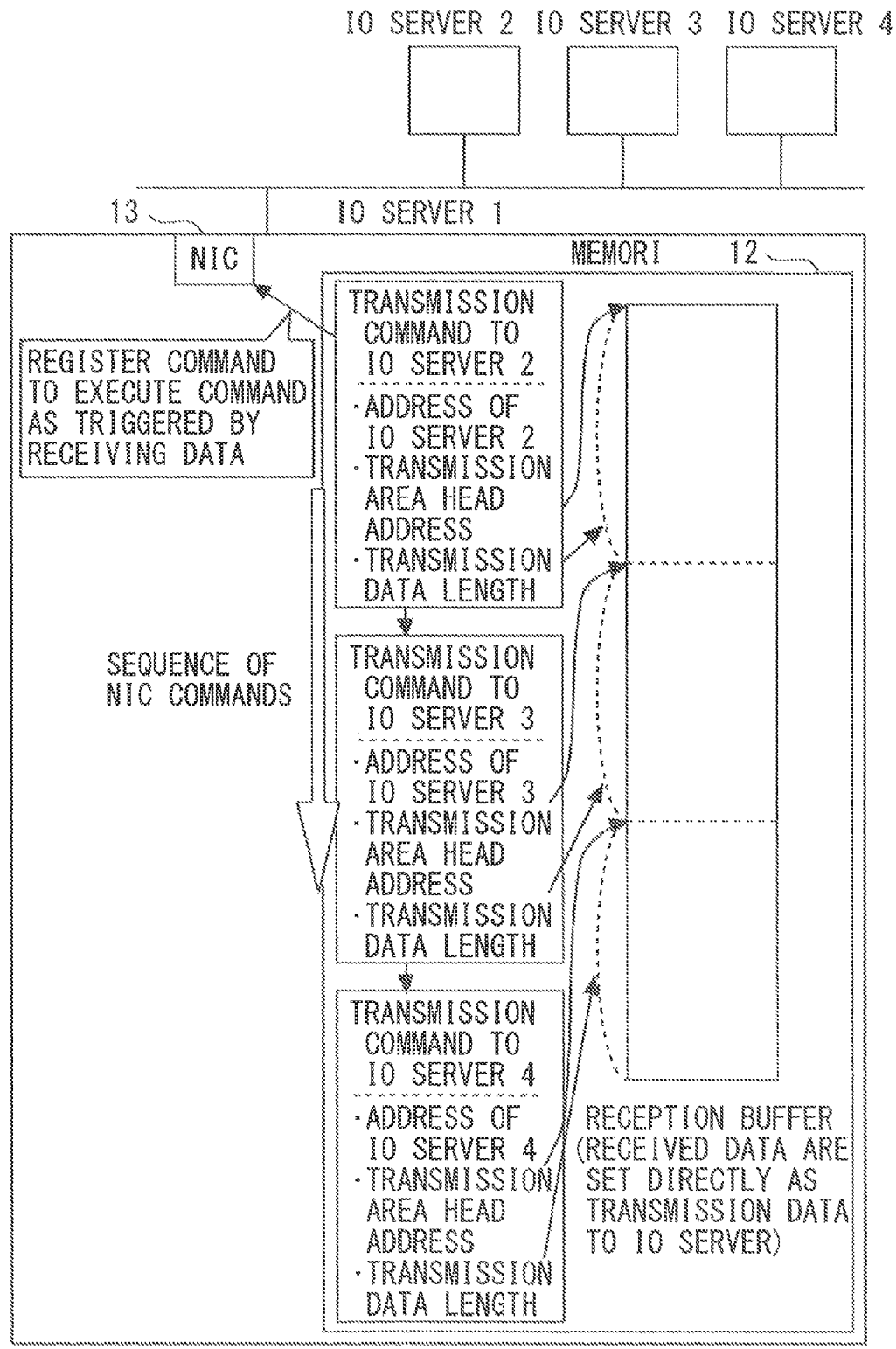
FIG. 9 is a diagram illustrating an image of a NIC command registered for using the remote NIC command execution mechanism.

FIG. 9 illustrates an image of the NIC command registered for using the remote NIC command execution mechanism. FIG. 9 depicts the four IO servers 1-4. It does not, however, mean that the number of the IO servers is a limitative element in the information processing system.

The IO server 1, as in FIG. 9, previously generates a transmission command containing a network address of each of the IO servers (IO servers 2-4) and a storage head address and a data length of the memory area to be transmitted to each IO server. The IO server 1 registers the generated transmission command in the NIC 13 beforehand so that the transmission command is executed when receiving the data. The storage head address of the memory area to be transmitted will hereinafter be called a transmission area head address.

The NIC 13 of the IO server, as already described in FIG. 3, includes the controller 13C and the memory 13D. The transmission command, illustrated in FIG. 9, to be registered in the NIC 13 is registered in a register defined in the memory 13D within the NIC 13. The command registered in this register is controlled within the NIC 13 so that a startup of the command is triggered by a predetermined event. This sort of control is executed with the same configuration as a configuration of, e.g., an interrupt processing circuit in a conventional computer system. As discussed above, the data can be transmitted, based on the remote NIC command execution mechanism, to the IO servers 2-4 without via the CPU 11 upon being triggered by the data reception of the IO server 1.

The register of the NIC 13 registers the transmission command to the IO server 2, the transmission command to the IO server 3 and the transmission command to the IO server 4 in the example of FIG. 9. The controller 13C of the NIC 13 sequentially starts up the commands in the register upon fulfilling the startup condition in the associative manner in the register, e.g., upon receiving the data. The controller 13C acquires the data having the transmission data length from the transmission area head address by accessing the memory 12 independently of the CPU 11 while adjusting the accesses to the CPU 11 and to the memory 12 through the bus adapter 13A, and transfers the acquired data to the designated IO servers 2, 3 and 4.

Figure 10:
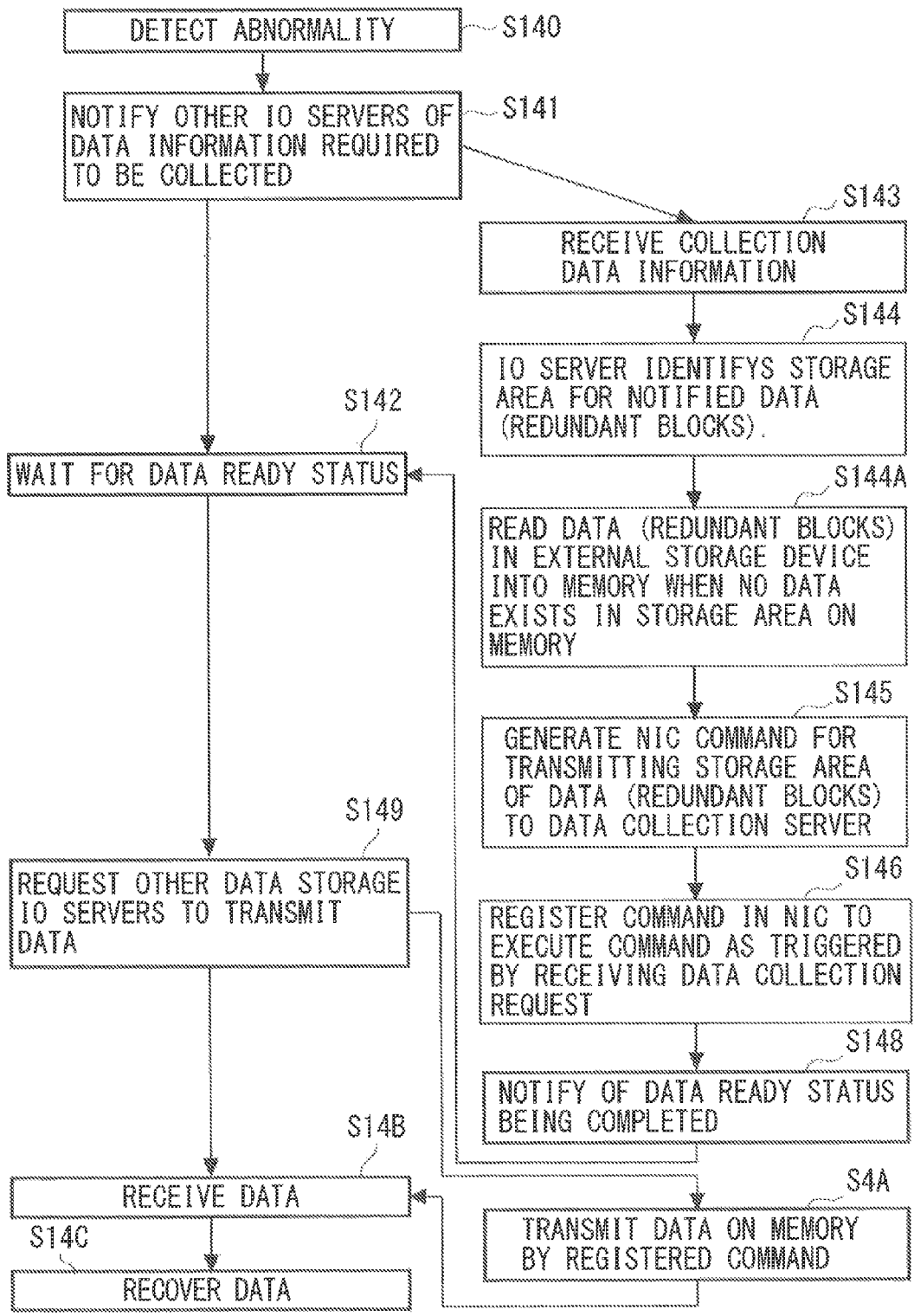
FIG. 10 is a diagram illustrating a flowchart of processes of recovering the data when data abnormality occurs in the IO server.

FIG. 10 illustrates a flowchart of processes when the data abnormality occurs in any of the IO servers and when recovering the normal data. At first, one IO server detects the data abnormality (S140). The time when the abnormality is detected in S140 is one example of when abnormality is detected in the plurality of information processing apparatuses.

The IO server encountering the occurrence of the data abnormality transmits notification of the data desired for collection (collection data information) to other IO servers (S141). In place of the IO server with the occurrence of the data abnormality, however, the IO server set in the management server may function as the data collection server to execute the processes in FIG. 10. The data collection server waits for the data till the data are transmitted (S142).

On the other hand, other IO servers receive the collection data information transmitted in S141 (S143). The process in S143 is one example of accepting a transfer request of the redundant data. Other IO servers identify storage areas for the collection target data, i.e., the redundant blocks retained in the IO servers themselves from the notified collection data information (S144).

Other IO servers read the collection target data from the external storage device 15 into the memory 12 when the collection target data are saved in the external storage device 15 but are not retained in the memory 12 (S144A). The IO server executes the process in S144A as one example of a process of reading the data of the external storage device into the storage unit.

Other IO servers generate the NIC commands for transmitting contents of the storage areas for the collection target data to the data collection server (S145). The NIC command contains designations of, e.g., a network address of the data collection server and a storage area (the transmission area head address, the transmission data length and other equivalent information), on the memory, of the redundant block defined as the collection target data. Each of other IO servers registers the NIC command in the NIC 13 so that the execution of the NIC command is triggered by receiving the data (S146). The process in S146 is one example of registering a command to execute a process of transferring the redundant data at a predetermined timing. Each of other IO servers notifies the data collection server of the data ready status being completed (S148). Processes from S148 onward are the same as the processed from S48 onward in FIG. 6, and hence their explanations are omitted.

However, the recovery process (S14C) of the normal data in the Example 2 is not based on the exclusive OR as in the Example 1 but may be attained such that the data collection serve simply executes a process of joining the collected redundant blocks. A description will be made by exemplifying a case in which the abnormality occurs in the IO server 1. For example, the original data A is stored in the IO server 1 as in FIG. 7, a copy of the data A is segmented into redundant blocks a2-an, and the redundant blocks a2-an are transferred from the IO servers 2-n via the NIC 13 and then stored. When the original data A becomes abnormal due to the abnormality of the server 1, it may be sufficient that the data collection server recovers the normal original data A by collecting the redundant blocks from the IO servers 2-n excluding the IO server 1 and joining these redundant blocks. When the IO server 1 functions as the data collection server, it may be sufficient that the data collection server collects the redundant blocks from the IO servers 2-n. When any one of the IO servers 2-n functions as the data collection server, it may be sufficient that the data collection server recovers the normal original data A by collecting the redundant blocks from the IO servers 2-n excluding the IO server itself and joining the collected redundant blocks and the redundant block of the IO server itself collecting the redundant blocks. The same is applied to a case in which the abnormality occurs in another IO server.

It may further be sufficient that the data collection server transmits, to other IO servers, the commands for instructing these other IO servers to read the redundant blocks, i.e., the data from the external storage devices 15 into the memories 12 with respect to the collection data information also in the Example 2 similarly to the example 1. It may be sufficient that the CPUs 11 of other IO servers give the notification of the data ready status being completed in S148 after reading the redundant blocks from the external storage devices 15 into the memories 12. This process enables the linkage between the inter-server communications of the IO servers not via the CPUs 11 but via the NICs 13 and the accesses of the CPUs 11 to the external storage devices 15. This results in improving the reliability of the data in the IO servers to a greater degree than hitherto while restraining the loads on the CPUs and the overhead accompanying the data transfer.

Figure 11:
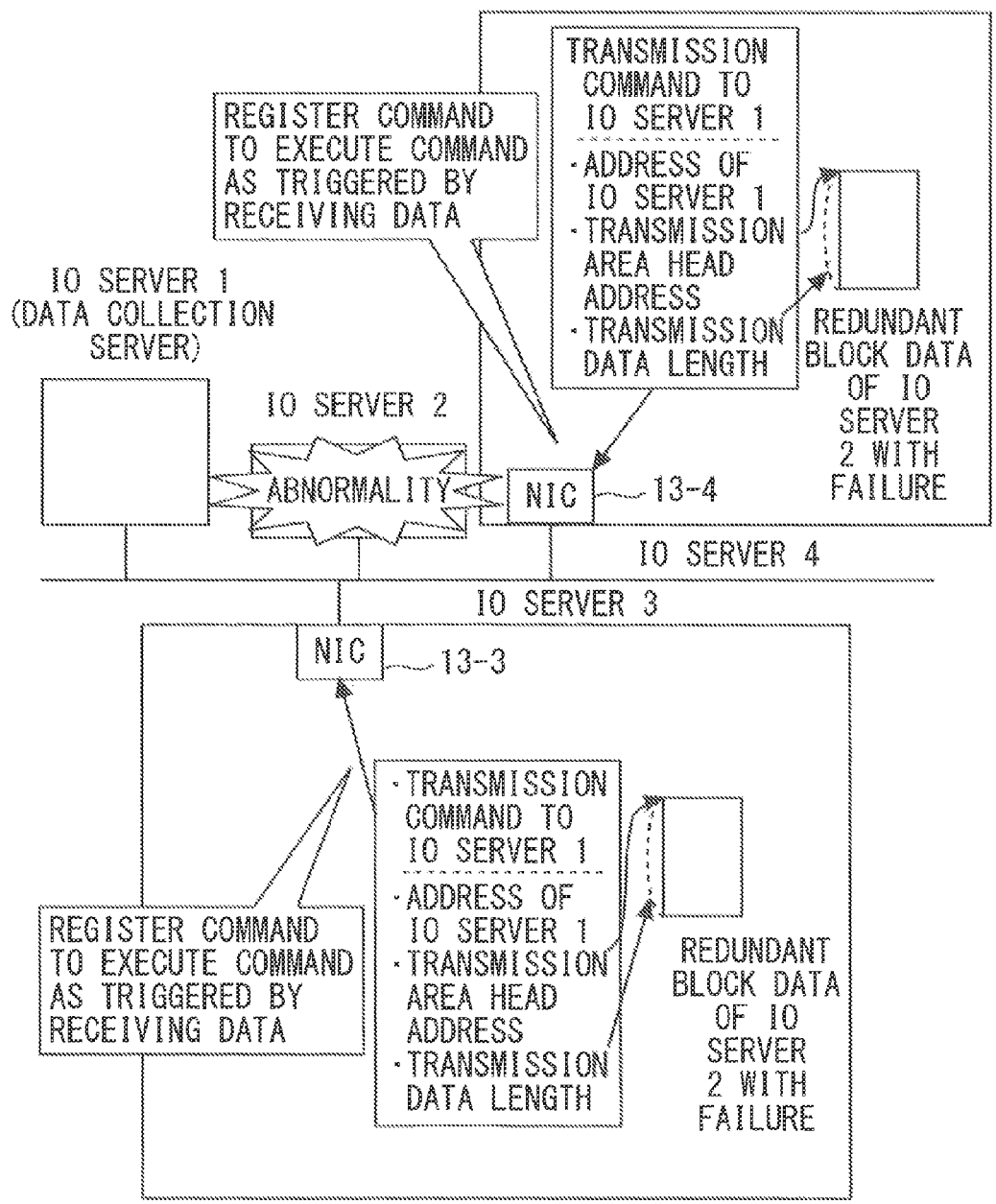
FIG. 11 is a diagram illustrating a NIC command registration process for collecting the data when the abnormality occurs in an IO server 2.

FIG. 11 illustrates a NIC command registration process for collecting the data when the abnormality occurs in the IO server 2. An example in FIG. 11 is that upon receiving the notification of the IO server 1 having a role of the data collection server, other IO servers 3 and 4 register the NIC commands in NIC 13-3 and NIC 13-4 so that the execution of the NIC commands is triggered by receiving the data. For example, the IO server 3 registers the NIC command in the register provided in a memory 13D of the NIC 13, the command serving as the transmission command to the IO server 1 and containing an address of the IO server 1, the transmission area head address and the transmission data length. An interrupt process is set in each NIC command registered in the register so that the execution of the NIC command is triggered by receiving the data. The same processing is applied to the IO server 4.

The redundant blocks obtained by copying the original data and segmenting the copy thereof are distributed, based on the remote NIC command execution mechanism, to other IO servers without via the CPUs in the information processing system according to the embodiment described above. The Example 2 also enables the redundant blocks to be distributed to other IO servers while restraining the increase in load on the CPU 11. When the abnormality occurs in any of the IO servers, one of the IO servers not encountering the occurrence of the abnormality functions as the information collection server, and this information collection server collects the redundant blocks from other IO servers to recover the original data in the information processing system according to the embodiment described above.

In this case, each IO server accepts a transfer request of the redundant data from the information collection server, and registers a command for executing the transfer process at a predetermined timing in the NIC 13 while designating a destination, on the network, of the information collection server and a storage location, on the memory, of the redundant data. The data collection therefore involves such a process that each IO server acquires, based on the remote NIC command execution mechanism, the data from the address, specified in the NIC command, of the memory 12 without via the CPU 11, and transfers the acquired data to the data collection server. In the configuration of the Example 2 also, the information processing system can thus recover the original data upon the occurrence of the abnormality by organizing the original data into the redundant data while restraining the increase in load on the CPU 11, the overhead and other equivalent loads.

The IO servers of the nodes 1-*n* are equal to each other in the Example 2, each IO server storing the original data of its own and retaining the data (redundant blocks) obtained by copying the original data of other nodes and segmenting these copies thereof. The information processing system in the Example 2 consequently facilitates ensuring both a symmetric property between the information processing apparatuses and uniformity of the loads. The IO servers of the nodes 1-*n* may retain the redundant data (additional redundant blocks) further generated by the exclusive OR or other equivalent operations of the redundant blocks obtained by copying the original data of other nodes and segmenting these copies thereof. The information processing system in the Example 2 can therefore further improve the reliability. In the Example 2, however, the IO servers of the nodes 1-*n* may set the additional redundant blocks as dummy null blocks without retaining the additional redundant blocks. The information processing system in the Example 2c can therefore flexibly vary a degree of redundancy corresponding to the reliability to be requested.

Figure 14:
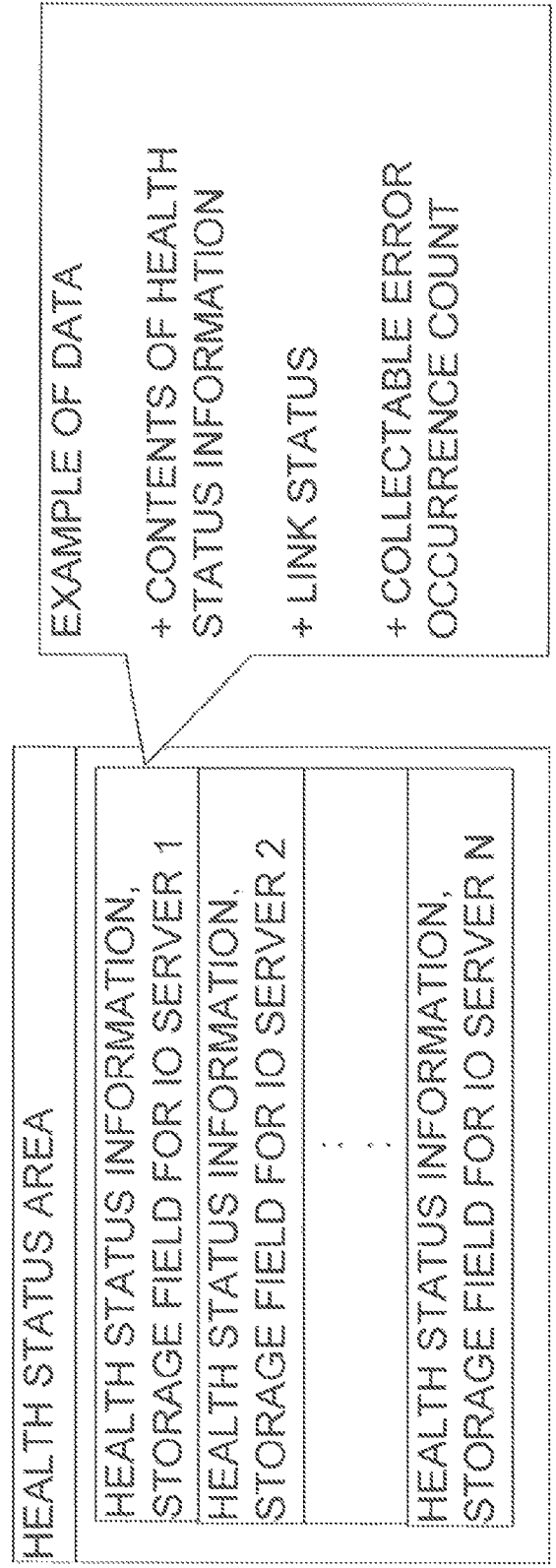
FIG. 14 is a diagram illustrating health status information.
Figure 15:
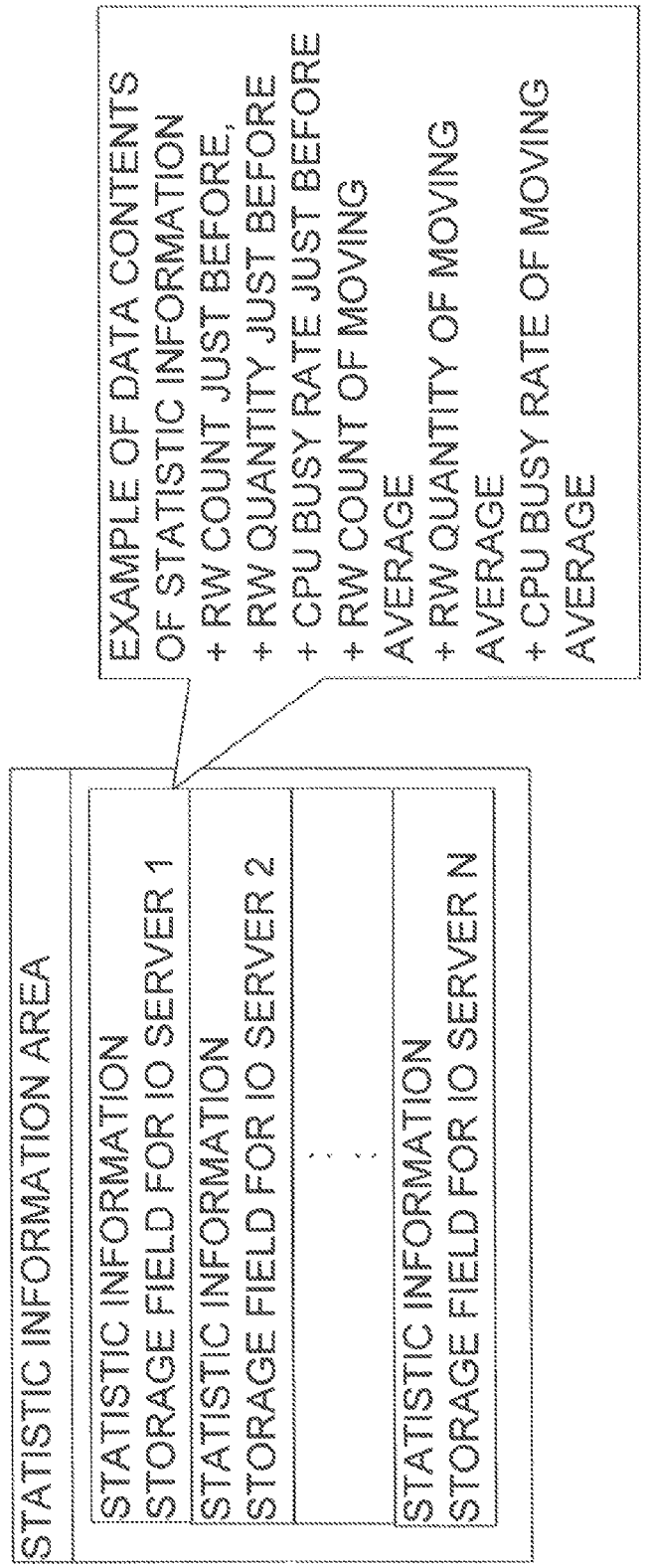
FIG. 15 is a diagram illustrating statistic information.

Note that various items of network information other than the data for recovering the data in the information processing system can be exemplified as data collection examples using the NIC commands. It may be sufficient that the information processing system collects, e.g., health status information representing soundness of the information processing system or statistic information representing a status of the information processing system by use of the NIC commands. FIGS. 14 and 15 in the following Example 3 illustrate specific examples of the health status information and the statistic information.

Example 3

The information processing system according to a third example (Example 3) will be described with reference to FIGS. 12 through 18. The information processing system in the example 3 introduces a structure named a monitor ring into the servers 1-*n* depicted in FIG. 1. Assumed is, e.g., an aggregation {aggregation having n-number of IO servers} mutually having n-number of redundant blocks generated from the copies of the original data on the basis of the "Latin square" exemplified in the Example 2. Among the IO servers belonging to this aggregation, each IO server monitors whether the abnormality occurs in another IO server and monitors loads (CPU load, IO load and other equivalent loads) thereof in a circular/annular relation that follows. The circular/annular relation is given by: IO server 1→IO server S2→IO server 3→ . . . →IO server n→IO server 1→ . . . . This {aggregation having n-number of IO servers} is called the "monitor ring" in the Example 3. The monitor ring is one example of an annular transmission path. In the example 3, the IO servers within the information processing system are mutually monitored according to the monitor ring, and the recovery process is executed for the IO server from which the abnormality is detected. The configuration and the operation of the Example 3 other than the monitor ring described above are the same as those of the Examples 1 and 2. This being the case, the same components in the Example 3 as the components of the Examples 1 and 2 are marked with the same numerals and symbols, and their repetitive explanations are omitted.

Figure 12:
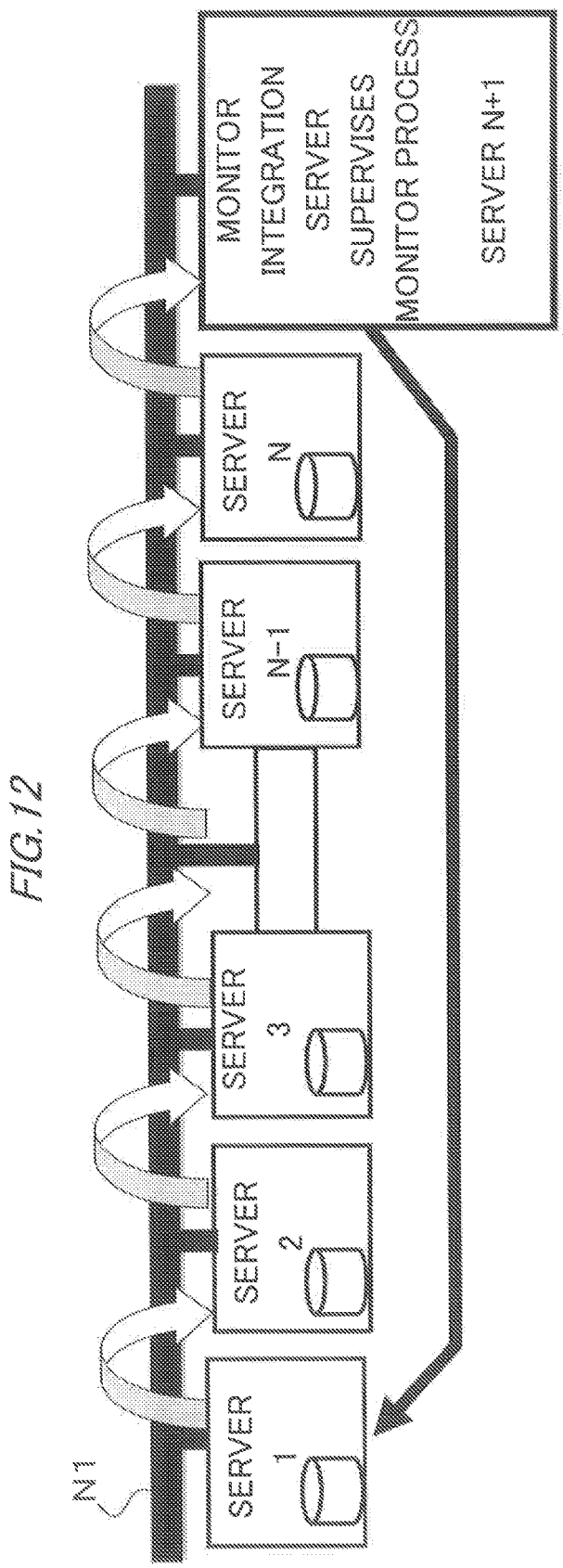
FIG. 12 is a diagram illustrating a configuration of a monitor ring.

FIG. 12 illustrates a configuration of the monitor ring. In FIG. 12, (n=N+1) number of IO servers are interconnected via a network N1. A block written as a server (SERVER) is one IO server in FIG. 12. The IO server 1 monitors the IO server 2; the IO server 2 monitors the IO server 3; an IO server N monitors an IO server N+1; and the IO server N+1 monitors the IO server 1. The IO server N+1 has roles of a monitor integration server and supervises the monitor processes. One of the roles of the monitor integration server lies in detecting that the monitor process based on the "monitor ring" circulates along the monitor ring once. A dedicated server may be prepared separately as the monitor integration server, and an arbitrary server within the monitor ring may also be assigned as the monitor integration server. The monitor integration server may be designated by use of, e.g., system parameters and other equivalent values of a setting file. It may be sufficient that the system parameters or other equivalent values of the setting file contain such a setting that the plurality of IO servers is assigned by determining a given priority order.

Communications performed for monitoring the IO servers can be restrained by using this monitor server. The loads on the network and the IO servers due to the monitor processes can be more uniformed than by the Example 2.

Figure 13:
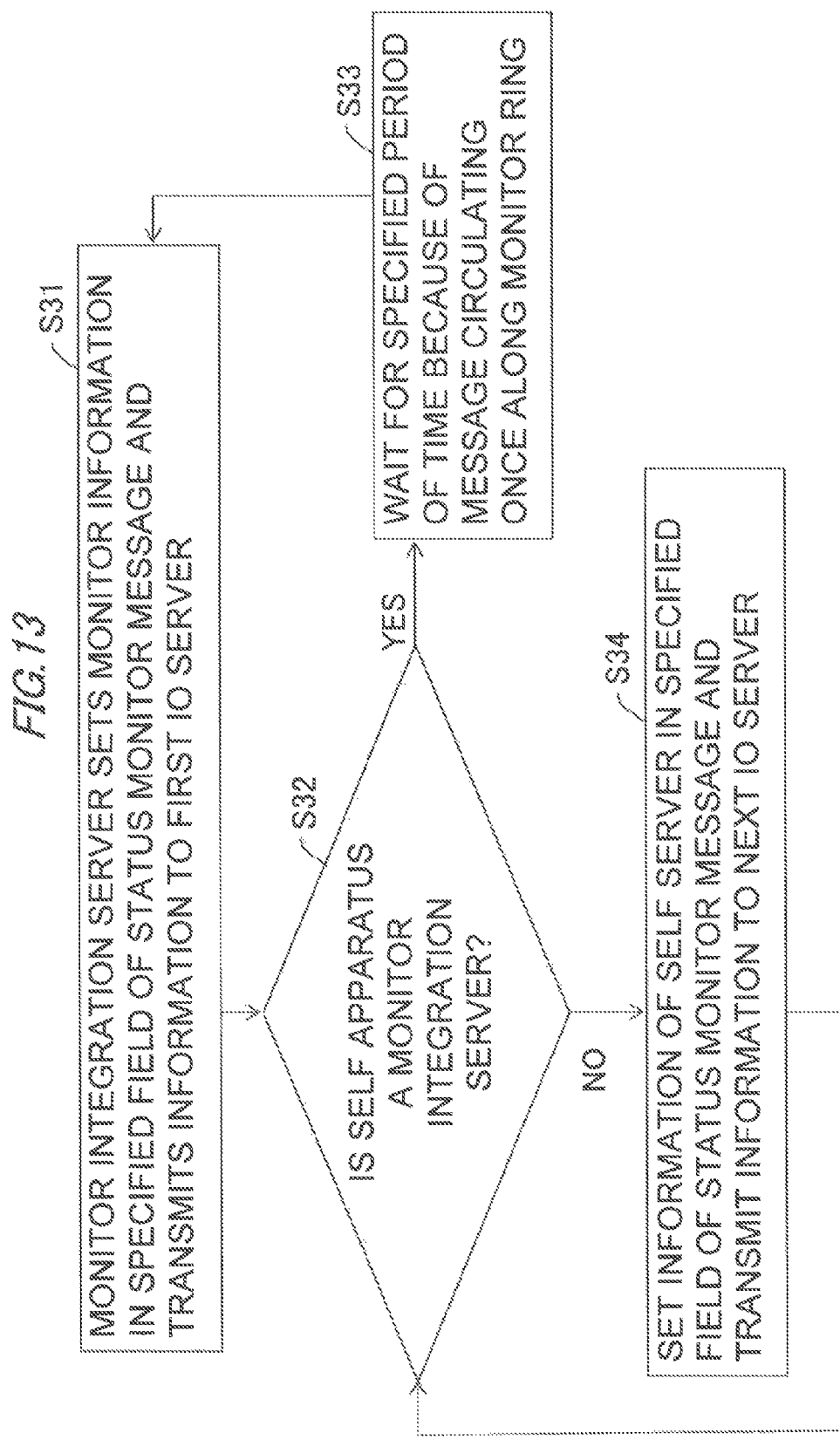
FIG. 13 is a diagram illustrating a processing flow to be executed in the monitor ring by the IO server.

FIG. 13 illustrates a processing flow to be executed in the monitor ring by the IO servers in the information processing system. Processes in FIG. 13 may be considered as a detailed example of the determining process in S3 of FIG. 4. In these processes, the monitor integration server sets monitor information in a status monitor message, and transmits this message to the first IO server 1 (S31). The NIC 13 of the monitor integration server executes the process in S31 as one example of transmitting the status monitor data to a destination on the annular transmission path.

Each IO server, e.g., the first IO server 1, having received the status monitor message determines whether the IO server itself is the monitor integration server (S32). When determining in S32 that the IO server itself is the monitor integration server, this connotes that the status monitor message circulates along the monitor ring once. Then, the monitor integration server stores the status monitor message in the memory 12, and waits for a specified period of time (S33). In the process of S33, the NIC 13 of the monitor integration server accumulates the monitor information of the collected status monitor message in the memory 12 at a terminal of the monitor ring. It may be sufficient that the CPU 11 of the monitor integration server save, in the external storage device 15, the monitor information accumulated in the memory 12 at the proper timing.

Thereafter, the monitor integration server advances the control to S31. Upon advancing the control to S31, the processing based on the monitor ring starts afresh, and the monitor integration server becomes an originating point of the monitor ring. The NIC 13 of the monitor integration server executes the process in S33 as one example of monitoring a status of the information processing system by the communication unit of one of the plurality of information processing apparatuses working as a start edge and a terminal edge of the annular transmission path.

Whereas when determining in S32 that the IO server itself is not the monitor integration server, the IO server sets the information of the IO server itself in a specified field of the status monitor message, and transmits the monitor information to the next IO server (S34). The process in S32 is continuously executed in the next IO server. The NIC 13 of the IO server executes the process in S34 as one example of adding by the communication unit of each of the plurality of information processing apparatuses, a status of each of the plurality of information processing apparatuses and transmitting status monitor data to a destination on the annular transmission path. The status monitor message is one example of the status monitor data.

FIGS. 14 and 15 illustrate a structure example and a data example of the monitor information contained in the status monitor message. FIG. 14 illustrates the information called the health status information in the monitor information. A storage area to store the health status information is also called a health status area. The health status information (health status area) is segmented into a storage field for the IO server 1, a storage field of the IO server 2, . . . , and a storage field for the IO server n. The segmented fields, i.e., the storage fields for the respective IO servers, of the health status area contain data instanced by a link status, a correctable error occurrence count and other equivalent data. The link status connotes a status of a link for connecting each IO server to another IO server which is connected to each IO server next within the monitor ring and called as the next IO server, and contains information indicating, e.g., a connected status, a cutoff status and other equivalent statuses.

FIG. 15 illustrates the information, called the statistic information, in the monitor information contained in the status monitor message. The monitor integration server accumulates the information of the IO servers within the monitor ring. The monitor integration server then aggregates the accumulated information of the IO servers to acquire the statistic information, and enables the statistic information to be also used for distributing the loads while checking a state of the loads on the IO servers.

The statistic information is stored in a storage area called a statistic information area. The statistic information area is segmented into a storage field for the IO server 1, a storage field of the IO server 2, . . . , and a storage field for the IO server n. The segmented fields, i.e., the storage fields for the respective IO servers, of the statistic information contain data instanced by a read/write count just before acquiring the statistic information, a read/write data quantity just before acquiring the statistic information, a CPU busy rate just before acquiring the statistic information, a read/write count of a moving average, a CPU busy rate of the moving average, and other equivalent data.

Herein, the read/write count just before acquiring the statistic information is a read/write count between the IO server and the memory 12 per unit time before generating the statistic information in FIG. 15. Similarly, the read/write data quantity just before acquiring the statistic information is a read/write data quantity to and from the memory 12 per unit time just before acquiring the statistic information. The CPU busy rate per unit time just before the same is an average CPU usage rate per unit time just before acquiring the statistic information. The "moving average" is a value obtained by averaging the read/write count just before the same, the read/write data quantity just before the same and the CPU busy rate just before the same by a predetermined period.

Figure 16:
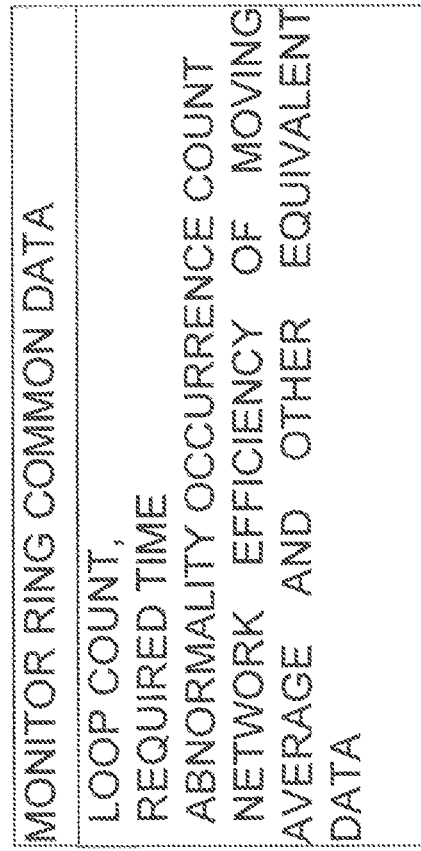
FIG. 16 is a diagram illustrating common data in the monitor ring.

FIG. 16 illustrates common data of the monitor ring. The monitor integration server retains the information of the whole monitor ring as in FIG. 16. A loop count is a number of times the status monitor message loops round the monitor ring for a predetermined period. A "predetermined period" is a period of processing time per loop of circulation. An abnormality occurrence count is a number of times the abnormality is detected for the predetermined period. Moving average network efficiency is, e.g., an average data transmission speed of the network for the predetermined period.

Figure 17:
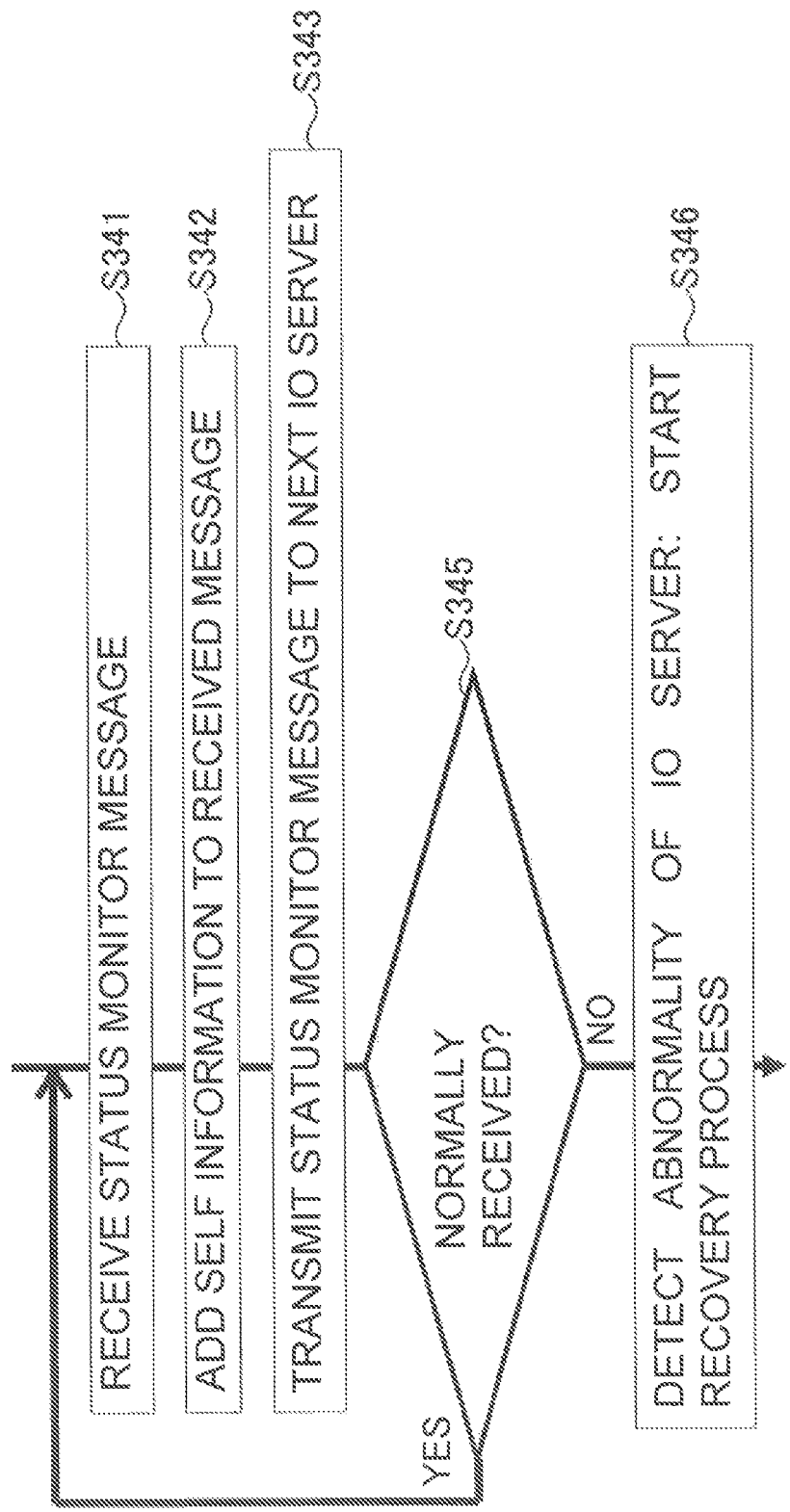
FIG. 17 is a diagram illustrating a recovery timing determination processing flow.

FIG. 17 illustrates a recovery timing determination processing flow. A recovery timing is determined by the IO server monitoring a monitor target within the monitor ring. The IO server carries out a recovery process upon detecting the abnormality of the monitor target IO server.

The following conditions are assumed as premise conditions for the recovery process in the Example 3. A condition (1) is that the monitor ring mechanism operates irrespective of whether there is a data access. Hence, even when having no data access to the information processing system from an external apparatus instanced by the client and other equivalent apparatuses, the abnormality of the IO server is detected as the case may be during the operation of the monitor ring mechanism. A condition (2) is that the monitoring in the monitor ring is performed by the IO server at a fixed cycle.

The controller 13C of the NIC 13 of the IO server receives the status monitor message (S341). The controller 13C adds the information of the IO server itself to the received status monitor message. The information to be added is the health status information, the statistic information or other equivalent information. The controller 13C transmits the status monitor message to the NIC 13 of the next IO server (S343). The controller 13C checks whether the status monitor message is normally received by the NIC 13 of the next IO server (S345). It can be checked from, e.g., an acknowledgment message and other equivalent messages given from the NIC 13 of the next IO server whether the status monitor message is normally received. When confirming in S345 that the message has been normally received, the NIC 13 of the IO server loops back the processing to S341 for receiving the next message. Whereas when unable to confirm in S345 that the message has been normally received, the NIC 13 of the IO server starts the recovery process (S346). The recovery process is the same as the procedures explained in FIG. 6 in the Example 1 and FIG. 10 in the Example 2. This being the case, it is assumed also in the Example 3 that the same recovery process (S40-S4C in FIG. 6 and S140-S14C in FIG. 10) is executed, and the detailed explanation thereof is omitted.

Figure 18:
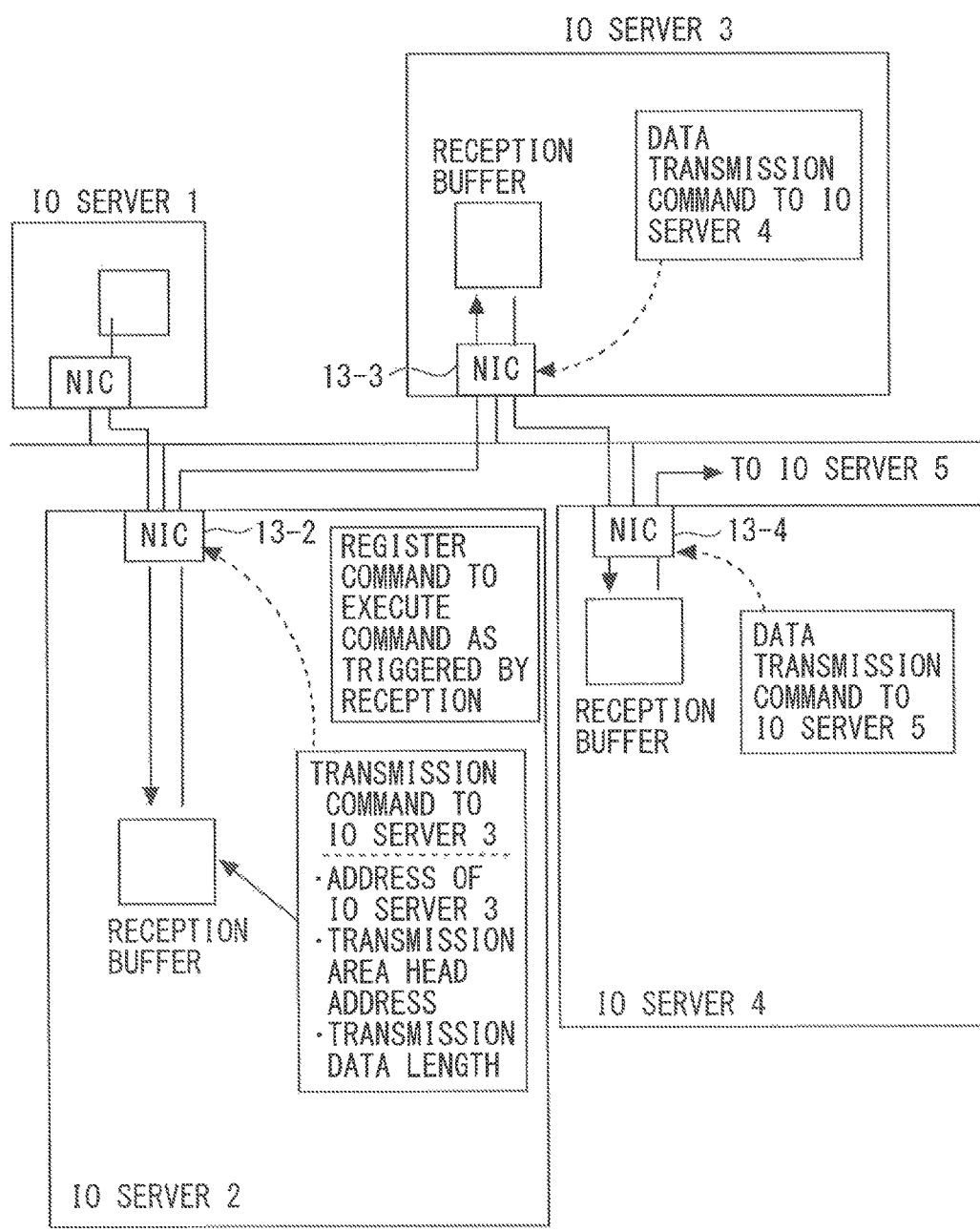
FIG. 18 is a diagram illustrating details of setting a command in a NIC 13 for a recovery process.

FIG. 18 illustrates details of how a command is set in the NIC 13 for the recovery process. In the Example 3, the communications for sharing a recovery timing and information for the recovery are performed without via the CPU 11 by using the remote NIC command execution mechanism. As in FIG. 18, the IO server previously generates the NIC command for transmission to the next IO server with the reception data area being used directly as a transmission area, and registers the NIC command in the NIC 13.

In the example of FIG. 18, e.g., the IO server 2 registers the NIC command to be transmitted to the IO server 3 in the register of the NIC 13-2 so that NIC command is executed when receiving the data. The NIC command for the transmission contains an address of the IO server 3, the transmission area head address and the transmission data length. Herein, the transmission area head address is the head address of the collection target data designated in the collection data information by the data collection server in the same way as in the Example 2. The transmission data length is a data length of the collection target data. As already described in FIGS. 6 and 10, however, when the collection target data are saved in the external storage device 15, it may be sufficient that the IO server as a destination of the data collection reads the data from the external storage device 15 into the transmission area head address of the memory 12 before notifying the data collection server of the data ready status being completed.

With this configuration, the command set in the register of the NIC 13 is started up at a timing when a reception buffer receives the data, and the transmission command to transmit the data to the IO server 3 is executed. The same setting is done in the IO servers, 3, 4 and other equivalent servers. With this setting, similarly to the cases in, e.g., FIGS. 6 and 10, when each IO server receives the transmission request, the NIC command registered in the register is executed, and the data having the transmission data length are transmitted from the transmission area head address. The IO server having detected the abnormality of the monitor target IO server therefore becomes the information collection server and receives, e.g., communication data within a time period from the IO servers exclusive of the monitor target IO server, thereby enabling the recovery of the normal data of the monitor target IO server with the abnormality. It may be also sufficient that the IO server having detected the abnormality of the monitor target IO server notifies the predetermined management server or the monitor ring server of the abnormality, and the IO server having received the notification becomes the information collection server to recover the normal data.

As discussed above, in the Example 3, the IO servers in the information processing system can monitor the monitor target IO servers thereof to distribute the loads and can monitor the abnormality according to the monitor ring. Further in the Example 3, the IO servers in the information processing system transfer and receive the status monitor message according to the monitor ring, and are thereby enabled to collect the health status information (FIG. 14) an the statistic information (FIG. 15) within the information processing system. When the IO servers in the information processing system transfer and receive the information according to the monitor ring, one IO server is made to function as the monitor integration server, whereby the start edge and the terminal edge can be set in the case of circulating the status monitor message, and the information can be acquired each time the status monitor message is circulated once.

Note that the reliable communications are attained such that each IO server performs the recovery from a packet loss and garbled data by a software-based protocol in a network instanced by Ethernet (registered trademark) and InfiniBand not having the reliability on the broadcast communications. This can be attained by using a technique instanced by Forward Error Correction and other equivalent techniques. A speedup of the broadcast communications for sharing the data recovery timing and the information used for the recovery is accomplished owing to the Forward Error Correction and other equivalent techniques even in an IO server environment configured by the unreliable network.

The plurality of IO servers may also use Barrier function of the MPI as a means for sharing the processing timing. For example, the InfiniBand apparatus of Mellanox Technologies, Ltd. Implements this Barrier function as a function of the NIC, and hence queuing can be done between the plurality of IO servers without via the processing by the CPU.

The Example 1 has exemplified the processes in the case of one block being lost from the n-number of blocks containing the (n−1) number of segmented data and the redundant blocks based on the exclusive OR of the segmented data within the monitor ring. In this case, the lost block can be recovered by the exclusive OR of the (n−1) pieces of remaining data. This recovery process can be executed by the hardware supporting the exclusive OR as an arithmetic operation without using the CPU 11 of the IO server. The data collection illustrated in FIG. 6 and the exclusive OR can be carried out without via the CPU 11 by implementing the "Reduction Operation" in accordance with standards of MPI (Message Passing Interface) between the controllers 13C of the NICs 13 of the plurality of IO servers. The "Reduction Operation" is preinstalled in the InfiniBand apparatus of Mellanox Technologies, Ltd. and can be therefore used for the data recovery process.

Incidentally, it is desirable that a client count per information processing apparatus can be set as many as possible in terms of a management cost for the information processing apparatuses instanced by the IO servers and other equivalent apparatuses. It therefore follows that a throughput of the information processing apparatus as a computer, particularly the load on the CPU (Central Processing Unit) or the memory is set at a high level. Consequently, the client count per IO server increases, with the result that a failure of the single IO server tends to affect the system greatly. On the other hand, with the system being scaled up, there rises an unbalanced degree of the loads between the plurality of IO servers within the system. An average utilization rate of capability of the IO system designed to be endurable against a maximum load does not therefore reach an increase equal to or larger than a fixed limit. Such a restraint of the utilization rate is an obstacle against improving a cost performance of the system. However, the configurations exemplified in the Example 1 through 3 discussed above enable the reliability to be enhanced while reducing the restraint of the loads on the IO servers.

<Non-Transitory Computer-Readable Recording Medium>

A program for making a computer, other machines and devices (which will hereinafter be referred to as the computer etc) realize any one of the functions can be recorded on a non-transitory recording medium readable by the computer etc. Then, the computer etc is made to read and execute the program on this recording medium, whereby the function thereof can be provided.

Herein, the recording medium readable by the computer etc connotes a recording medium capable of accumulating information such as data and programs electrically, magnetically, optically, mechanically or by chemical action, which can be read by the computer etc. Among these recording mediums, for example, a flexible disc, a magneto-optic disc, a CD-ROM, a CD-R/W, a DVD, a Blu-ray disc, a DAT, an 8 mm tape, a memory card such as a flash memory, etc are given as those removable from the computer. Further, a hard disc, a ROM (Read-Only Memory), etc are given as the recording mediums fixed within the computer etc. Further, SSD (Solid State Drive) is usable as any of the recording mediums removable from the computer etc. and the recording mediums fixed within the computer etc.

<Others>

The present embodiment encompasses the following aspects. The respective aspects are described as Notes. Configurations according to the respective aspects can be combined with other aspects.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such example in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. An information processing system including a plurality of information processing apparatuses, each apparatus of the plurality of information processing apparatuses comprising:
   an arithmetic processing device to execute an arithmetic process;
   a storage unit to store data; and
   a communication unit to access the storage unit without intermediary of the arithmetic processing device and to access a second apparatus of the plurality of information processing apparatuses via a communication unit of the second apparatus,
   the communication unit of a first apparatus of the plurality of information processing apparatuses, executing at least one of a process of storing redundant data which is generated by making data stored in the storage unit of the first apparatus be redundant in the storage unit of the second apparatus via the communication unit of the second apparatus, and a process of acquiring redundant data which is generated by making data stored in the storage unit of the second apparatus be redundant via the communication unit of the second apparatus, and storing the acquired data in the storage unit of the first apparatus.

2. The information processing system according to claim 1, wherein when abnormality is detected in any of the plurality of information processing apparatuses, the communication unit of the first apparatus to recover normal data among the plurality of information processing apparatuses acquires the redundant data, corresponding to the normal data, stored in the storage unit of the second apparatus or data for recovering the normal data in combination with the redundant data via the communication unit of the second apparatus, and recovers the normal data.

3. The information processing system according to claim 1, wherein the communication unit of the first apparatus generates segmented redundant blocks obtained by segmenting the redundant data copied from the data stored in the storage unit of the first apparatus by a number of information processing apparatuses exclusive of the first apparatus itself, and stores the segmented redundant blocks in the storage unit of the information processing apparatuses via the communication unit of the information processing apparatuses.

4. The information processing system according to claim 3, wherein when the abnormality is detected in any of the plurality of information processing apparatuses, the communication unit of the first apparatus to recover the normal data among the plurality of information processing apparatuses acquires the segmented redundant blocks stored in the storage unit of the information processing apparatuses exclusive of the first apparatus itself via the communication unit of the information processing apparatuses, and recovers the normal data.

5. The information processing system according to claim 1, wherein the plurality of information processing apparatuses form an annular transmission path to transfer status monitor data in a predetermined ring sequence,
   the communication unit of each apparatus of the plurality of information processing apparatuses adds a status of each apparatus to the status monitor data received from a sender on the annular transmission path, and transmits the status monitor data to a destination on the annular transmission path, and
   the communication unit of one of the plurality of information processing apparatuses becomes a start edge and a terminal edge of the annular transmission path and monitors a status of the information processing system.

6. The information processing system according to claim 1, wherein each apparatus of the plurality of information processing apparatuses further comprises an external storage device,
   the arithmetic processing device of the first apparatus saves, after acquiring the data given to the storage unit of the first apparatus from the storage unit of the second apparatus via the communication unit of the second apparatus, the acquired data in the external storage device, and reads, before transferring the data to the second apparatus via the communication unit of the second apparatus, the data of the external storage device into the storage unit of the first apparatus in response to a request of the second apparatus.

7. An information processing apparatus as a first apparatus of a plurality of information processing apparatuses interconnected within an information processing system, the information processing apparatus comprising:
an arithmetic processing device to execute an arithmetic process;
a storage unit to store data; and
a communication unit to access the storage unit without intermediary of the arithmetic processing device and to access a second apparatus of the plurality of information processing apparatuses via the communication unit of the second apparatus,
the communication unit executing at least one of a process of storing redundant data which is generated by making data stored in the storage unit of the first apparatus be redundant in the storage unit of the second apparatus via the communication unit of the second apparatus, and a process of acquiring redundant data which is generated by making data stored in the storage unit of the second apparatus be redundant via the communication unit of the second apparatus, and storing the acquired data in the storage unit of the first apparatus.

8. The information processing apparatus according to claim 7, wherein when the first apparatus in the plurality of information processing apparatuses recovers normal data upon detecting abnormality in any of the plurality of information processing apparatuses, the communication unit of the first apparatus acquires the redundant data, corresponding to the normal data, stored in the storage unit of the second apparatus or data for recovering the normal data in combination with the redundant data via the communication unit of the second apparatus, and recovers the normal data.

9. The information processing apparatus according to claim 7, wherein the communication unit of the first apparatus generates segmented redundant blocks obtained by segmenting the redundant data copied from the data stored in the storage unit of the first apparatus by a number of information processing apparatuses exclusive of the first apparatus itself, and stores the segmented redundant blocks in the storage unit of the information processing apparatuses via the communication unit of the information processing apparatuses.

10. The information processing apparatus according to claim 9, wherein when the first apparatus recover the normal data upon detecting the abnormality in any of the plurality of information processing apparatuses, the communication unit of the first apparatus acquires the segmented redundant blocks stored in the storage unit of the information processing apparatuses exclusive of the first apparatus itself via the communication unit of the information processing apparatuses, and recovers the normal data.

11. The information processing apparatus according to claim 7, wherein the plurality of information processing apparatuses form an annular transmission path to transfer status monitor data in a predetermined ring sequence,
the communication unit of each apparatus of the plurality of information processing apparatuses adds a status of each apparatus to the status monitor data received from a sender on the annular transmission path, and transmits the status monitor data to a destination on the annular transmission path, and
the communication unit of one of the plurality of information processing apparatuses becomes a start edge and a terminal edge of the annular transmission path and monitors a status of the information processing system.

12. The information processing apparatus according to claim 7, further comprising an external storage device, wherein the arithmetic processing device of the first apparatus saves, after acquiring the data given to the storage unit of the first apparatus from the storage unit of the second apparatus via the communication unit of the second apparatus, the acquired data in the external storage device, and reads, before transferring the data to the second apparatus via the communication unit of the second apparatus, the data of the external storage device into the storage unit of the first apparatus in response to a request of the second apparatus.

13. A control method of an information processing system including a plurality of information processing apparatuses, comprising:
accessing a storage unit without intermediary of an arithmetic processing device;
accessing a second apparatus of the plurality of information processing apparatuses via a communication unit of the second apparatus;
at least one of a process of storing redundant data which is generated by making data stored in a storage unit of a first apparatus be redundant in a storage unit of the second apparatus via a communication unit of the second apparatus, and a process of acquiring redundant data which is generated by making data stored in the storage unit of the second apparatus be redundant via the communication unit of the second apparatus and storing the acquired data in the storage unit of the first apparatus.

14. The control method for the information processing system according to claim 13, wherein when abnormality is detected in any of the plurality of information processing apparatuses, the communication unit of the first apparatus to recover normal data among the plurality of information processing apparatuses acquires the redundant data, corresponding to the normal data, stored in the storage unit of the second apparatus or data for recovering the normal data in combination with the redundant data via the communication unit of the second apparatuses, and recovers the normal data.

15. The control method for the information processing system according to claim 13, wherein the communication unit of the first apparatus generates segmented redundant blocks obtained by segmenting the redundant data copied from the data stored in the storage unit of the first apparatus by a number of information processing apparatuses exclusive of the first apparatus, and stores the segmented redundant blocks in the storage unit of the second apparatus via the communication unit of the second apparatus.

16. The control method for the information processing system according to claim 15, wherein when the abnormality is detected in any of the plurality of information processing apparatuses, the communication unit of the first apparatus to recover the normal data in the plurality of information processing apparatuses acquires the segmented redundant blocks stored in the storage unit of the second apparatus via the communication unit of the second apparatus, and recovers the normal data.

17. The control method for the information processing system according to claim 13, wherein the plurality of information processing apparatuses form an annular transmission path to transfer status monitor data in a predetermined ring sequence, further comprising:
adding by the communication unit of each of the plurality of information processing apparatuses, a status of each of the plurality of information processing apparatuses to the status monitor data received from a sender on the annular transmission path;

transmitting the status monitor data to a destination on the annular transmission path; and monitoring a status of the information processing system by the communication unit of one of the plurality of information processing apparatuses working as a start edge and a terminal edge of the annular transmission path.

18. The control method for the information processing system according to 13, wherein each of the plurality of information processing apparatuses further includes an external storage device, further comprising:

saving by the arithmetic processing device of each apparatus of the plurality of information processing apparatuses, after acquiring the data given to the storage unit of each apparatus from the storage unit of the second apparatus via the communication unit of the second apparatus, the acquired data in the external storage device; and reading, before transferring the data to the second apparatus via the communication unit of the second apparatus, the data of the external storage device into the storage unit of the first apparatus in response to a request of the second apparatus.

19. An information processing apparatus comprising:
a processor;
a storage unit; and
a communication unit to access the storage unit without intermediary of the processor and to access each of a second information processing apparatuses via the communication units of each of the second information processing apparatuses interconnected via a network, the processor, based on a sequence of instructions in the storage unit, executing:

acquiring redundant data of data stored in one or more of the second information processing apparatuses to store the acquired redundant data in the storage unit, the data being acquired via the communication unit;

accepting a transfer request of the redundant data from an information processing apparatus to collect the redundant data among the second information processing apparatuses; and registering a command to execute a process of transferring the redundant data at a predetermined timing by the communication unit with a designation of a destination on the network of the information processing apparatus to collect the redundant data and a designation of a storage location on the storage unit of the redundant data.

20. An information processing method implemented by an information processing apparatus including a processor, a storage unit, and a communication unit to access the storage unit without intermediary of the processor and to access any apparatus of a second information processing apparatuses via the communication unit of the apparatus of the second information processing apparatuses interconnected via a network, the information processing method comprising:

acquiring redundant data of data stored in one or more of the second information processing apparatuses to store the acquired redundant data in the storage unit, the data being acquired via the communication unit;

accepting a transfer request of the redundant data from an information processing apparatus to collect the redundant data among the second information processing apparatuses; and registering a command to execute a process of transferring the redundant data at a predetermined timing by the communication unit with a designation of a destination on the network of the information processing apparatus to collect the redundant data and a designation of a storage location on the storage unit of the redundant data.

21. A computer-readable non-transitory storage medium storing a control program of an information processing apparatus including a processor to perform an arithmetic operation, a storage unit, and a communication unit to access the storage unit without intermediary of the processor and to access any apparatus of a second information processing apparatuses via the communication unit of the apparatus of the second information processing apparatuses connected via a network, the control program causing processor to perform:

acquiring redundant data of data stored in one or more of the second information processing apparatuses to store the acquired redundant data in the storage unit, the data being acquired via the communication unit;

accepting a transfer request of the redundant data from an information processing apparatus to collect the redundant data among the second information processing apparatuses; and registering a command to execute a process of transferring the redundant data at a predetermined timing by the communication unit with a designation of a destination on the network of the information processing apparatus to collect the redundant data and a designation of a storage location on the storage unit of the redundant data.

* * * * *